United States Patent
Matsumura et al.

(10) Patent No.: US 7,564,973 B2
(45) Date of Patent: Jul. 21, 2009

(54) DIGITAL WATERMARK EMBEDDING DEVICE AND DIGITAL WATERMARK EMBEDDING METHOD

(75) Inventors: Yuuki Matsumura, Tokyo (JP); Osamu Nakamura, Saitama (JP); Shunichi Soma, Chiba (JP); Takashi Kohashi, Tokyo (JP)

(73) Assignee: Sony Corporation (JP)

(*) Notice: Subject to any disclaimer, the term of this patent is extended or adjusted under 35 U.S.C. 154(b) by 775 days.

(21) Appl. No.: 10/162,101

(22) Filed: Jun. 3, 2002

(65) Prior Publication Data

US 2002/0181706 A1    Dec. 5, 2002

(30) Foreign Application Priority Data

Jun. 5, 2001    (JP)    ............................ P2001-169109

(51) Int. Cl.
*H04N 7/167* (2006.01)
*H04K 1/00* (2006.01)
*H04L 9/00* (2006.01)
*G06K 9/00* (2006.01)

(52) U.S. Cl. ........................... 380/205; 380/51; 380/54; 380/200; 380/210; 380/250; 380/287; 726/22; 713/176; 705/57; 382/100; 382/107; 348/699

(58) Field of Classification Search .................. 726/22; 705/57; 713/176; 380/200, 210, 250, 287, 380/51, 54; 382/100, 107; 348/699
See application file for complete search history.

(56) References Cited

U.S. PATENT DOCUMENTS

| | | | | |
|---|---|---|---|---|
| 5,506,622 A | * | 4/1996 | Kim | ........................ 375/240.16 |
| 5,960,081 A | * | 9/1999 | Vynne et al. | ................. 713/176 |
| 6,188,728 B1 | * | 2/2001 | Hurst | ..................... 375/240.16 |
| 6,262,299 B1 | | 7/2001 | Tsai et al. | |
| 6,282,299 B1 | * | 8/2001 | Tewfik et al. | ................ 382/100 |
| 6,341,350 B1 | * | 1/2002 | Miyahara et al. | ............ 713/176 |
| 6,442,284 B1 | * | 8/2002 | Gustafson et al. | ........... 382/100 |
| 6,449,378 B1 | | 9/2002 | Yoshida et al. | |
| 6,639,996 B2 | * | 10/2003 | Suda | .......................... 382/100 |
| 6,707,930 B2 | * | 3/2004 | Kalker et al. | ................. 382/100 |

(Continued)

FOREIGN PATENT DOCUMENTS

JP    11-355736    12/1999

OTHER PUBLICATIONS

Kim et al., Perceptually Tuned Robust Watermarking Scheme For Digital Video Using Motion Entropy Masking, 1999 Digest of Technical Papers, International Conference on Consumer Electronics, Jun. 22-24, 1999, pp. 104-105.

*Primary Examiner*—Ayaz R. Sheikh
*Assistant Examiner*—Trang Doan
(74) *Attorney, Agent, or Firm*—Lerner, David, Littenberg, Krumholz & Mentlik, LLP

(57) ABSTRACT

A digital watermark embedding device and method uses block correlation to perform motion detection on temporally sequential digital video signals after performing preprocessing such as division into blocks. The device and method evaluate a plurality of motion information which are calculated for blocks by using a technique such as determination by majority or weighting. Based on the detected motion information, by moving a digital watermark pattern to follow a picture, the digital watermark information can be superimposed on an input digital video signal so as to match human visual characteristics by using a technique such as emphasizing a portion on which the human eye is easily turned.

12 Claims, 16 Drawing Sheets

U.S. PATENT DOCUMENTS

| | | | |
|---|---|---|---|
| 6,711,276 B1 * | 3/2004 | Yoshiura et al. | 382/100 |
| 6,757,405 B1 * | 6/2004 | Muratani et al. | 382/100 |
| 6,957,350 B1 * | 10/2005 | Demos | 380/203 |
| 7,058,979 B1 * | 6/2006 | Baudry et al. | 726/32 |
| 7,203,335 B2 * | 4/2007 | Fielding et al. | 382/100 |
| 7,336,799 B2 * | 2/2008 | Matsumura et al. | 382/100 |
| 2002/0114488 A1 * | 8/2002 | Suda | 382/100 |
| 2003/0068067 A1 * | 4/2003 | Fielding et al. | 382/100 |

\* cited by examiner

FIG. 6A
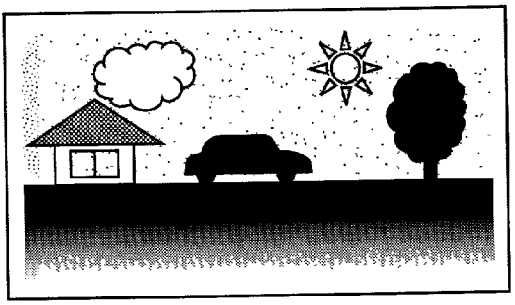
FIG. 6B
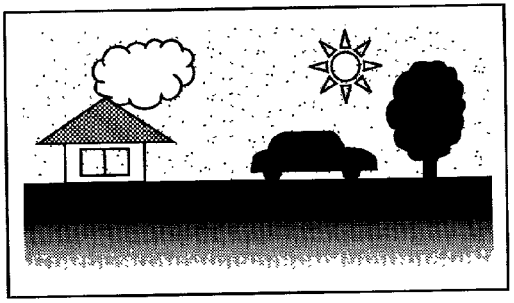
FIG. 6C
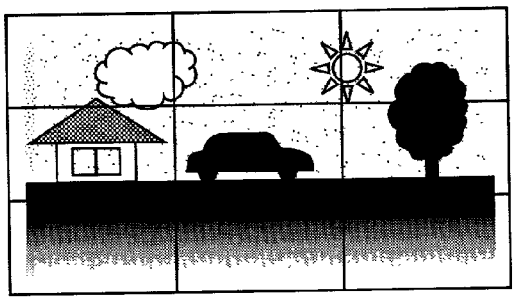
FIG. 6D
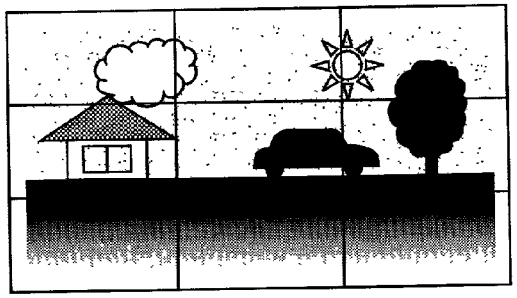
FIG. 6E
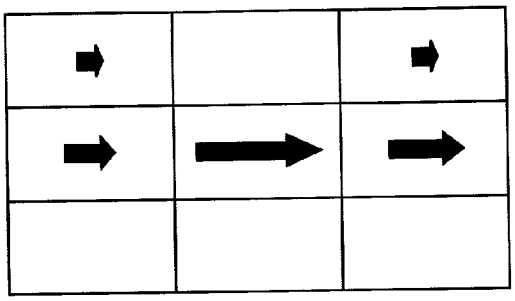
FIG. 6F
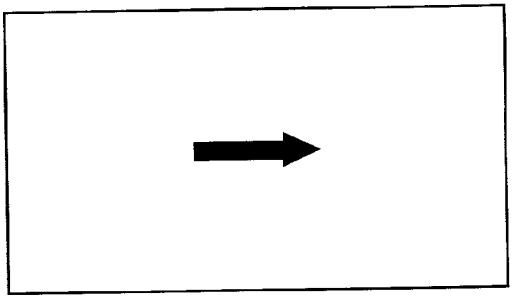
FIG. 6G
Watermark Watermark Water
  Watermark Watermark Wate
k Watermark Watermark Wat
rk Watermark Watermark Wa
ark Watermark Watermark W
mark Watermark Watermark
FIG. 6H
rmark Watermark Watermark
ermark Watermark Waterma
termark Watermark Waterma
atermark Watermark Waterm
Watermark Watermark Water
  Watermark Watermark Wate FIG. 7A
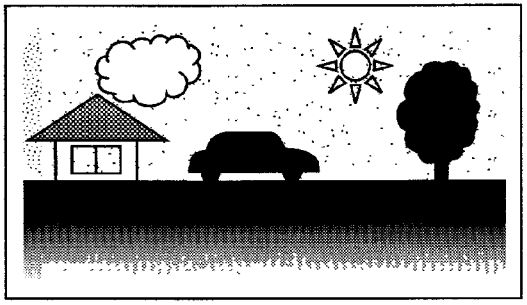
FIG. 7B
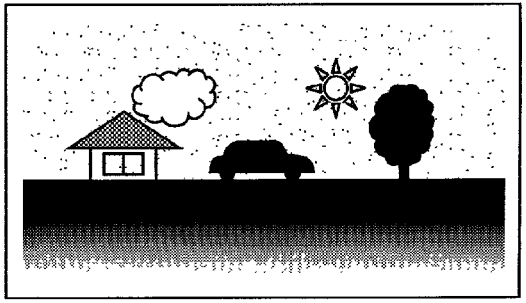
FIG. 7C
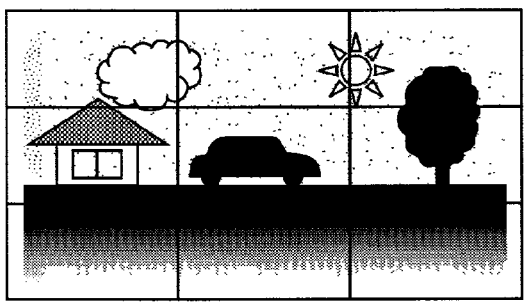
FIG. 7D
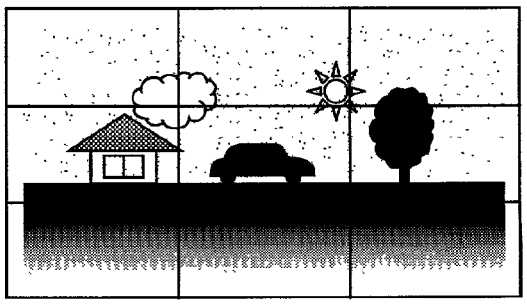
FIG. 7E
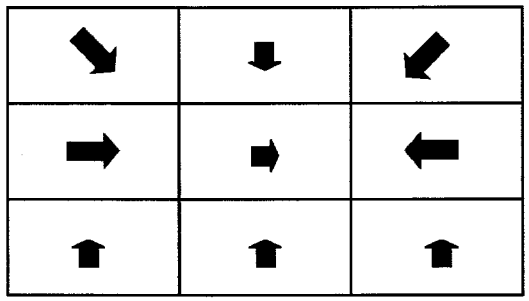
FIG. 7F
FIG. 7G
Watermark Watermark Water
 Watermark Watermark Wate
k Watermark Watermark Wat
rk Watermark Watermark Wa
ark Watermark Watermark W
mark Watermark Watermark
FIG. 7H
Watermark Watermark Water
 Watermark Watermark Wate
k Watermark Watermark Wat
rk Watermark Watermark Wa
ark Watermark Watermark W
mark Watermark Watermark

DIGITAL WATERMARK EMBEDDING DEVICE AND DIGITAL WATERMARK EMBEDDING METHOD

BACKGROUND OF THE INVENTION

1. Field of the Invention

The present invention relates to a technology in which additional information such as copyright information and editing information can be embedded in or read from data such as a picture. The present invention relates to, for example, a digital watermark embedding device and method that execute a process (called "digital watermarking" or "data hiding") of embedding a digital watermark in a picture as additional information that cannot be perceived when the picture is observed normally.

2. Description of the Related Art

With advances in digital technology, digital recording/playback devices that eliminate problems caused by repeatedly executing playback processing, such as picture quality deterioration and sound quality deterioration, have come into widespread use. In addition, various types of digital content such as various pictures and pieces of music have become distributable by using media such as digital versatile disks (DVDs) and compact disks (CDs) or by networks.

Unlike analog recording and playback, in digital recording/playback technology, quality similar to that of the original data is maintained because the data does not deteriorate even if the data is repeatedly recorded or played back. Widespread use of this digital recording/playback technology results in a flood of unauthorized copies, which is a big problem from the point of view of copyright protection.

To cope with copyright infringement caused by unauthorized copies of digital content, a system for preventing unauthorized copying is known. This system functions by adding copy control information for controlling copying of digital content, reading the copy control information in a content recording or playback mode, and executing processing in accordance with the read copy control information.

There are various systems for controlling copying of content. For example, among them, a common one is the Copy Generation Management System (CGMS). When the CGMS is applied to analog video signals (which may be called "CGMS-A"), among 20 bits of additional information to be superimposed on an effective video part in one specified horizontal interval in the vertical blanking period of the brightness signal, for example, on an effective video part in the twentieth horizontal interval in the case of an NTSC (National Television System Committee) signal, two bits are superimposed as copy control information. When the CGMS is applied to digital video signals (which may be called "CGMS-D"), the signals are transmitted in a form including 2-bit copy-control information as additional information to be added to digital video data.

In the CGMS, the 2-bit information (hereinafter referred to as the "CGMS information") has the following meanings: "00" indicates that content may be copied; "10" indicates that content may be copied once (copying is permitted for only one generation); and "11" indicates that content is prohibited from being copied (strict prohibition of copying).

The above CGMS is one type of common copy control system. In addition, there are other systems for protecting the copyright of content. For example, digital broadcasting by broadcasting stations employs a copy generation control system that, by storing a digital copy control descriptor in program information (i.e., service information) included in transport stream (TS) packets constituting the digital data, performs copy generation control in accordance with the digital copy control descriptor when data received by a receiver is recorded in a recording unit.

Since the above descriptor is added as bit data to, for example, the content header, it is impossible to completely exclude the possibility of interpolation of the added data. A system that is advantageous in excluding the possibility of data interpolation is digital watermarking. It is impossible to view or perceive a watermark under normal playback conditions of the content (picture data or audio data). Embedding and detection of the watermark can be performed only by executing a particular algorithm or by a particular device. When content is processed by a device such as a receiver or a recording/playback unit, by detecting the watermark and controlling the processing in accordance with the watermark, reliable control can be realized.

In the method that employs digital watermarking to protect of the copyright of content, etc., which is transmitted by using a recording medium such as an optical disk, or by media such as satellite, terrestrial waves, or cable from a broadcasting station or the like, signals generated by modulating copyright data is recorded in a form in which they can be superimposed on video signals or audio signals. In the digital network age in which various types of digital content, such as pictures, sound, and data, might be copied and distributed without deteriorating, watermarking is a major technology of protecting copyright by embedding information in content itself.

Information that can be embedded by watermarking includes, not only the above copy control information, but also various types of information such as content copyright information, content modification information, content structure information, content processing information, content editing information, and content-playback-system information. For example, by using watermarks to embed pieces of editing information in a content editing mode, recognition of each process step can be performed in each editing step by referring to its watermark. This editing information is embedded as a new watermark in the content, for example, in each step of editing the content, and a final process such as removal of the watermark from the content is performed.

Various techniques for embedding and detecting digital watermarks in data have been proposed. A common digital watermarking technique is a technique based on data representing original signals, for example, statistical properties of pictures. Based on the statistical properties of picture signals such as digital video signals, a method that embeds a digital watermark while using pseudorandom-noise-series (PN-series) random-number data as a basic pattern is described below. For brevity of description, it is assumed that brightness-signal frame data has a horizontal size of eight pixels and a vertical size of six pixels.

First, PN-series random-number data PN is set as follows:

$$WN = PN = \begin{pmatrix} +1 & -1 & +1 & +1 & -1 & +1 & -1 & -1 \\ +1 & +1 & -1 & -1 & -1 & +1 & -1 & +1 \\ -1 & +1 & +1 & -1 & -1 & +1 & -1 & +1 \\ +1 & -1 & -1 & -1 & +1 & -1 & -1 & -1 \\ -1 & -1 & +1 & +1 & +1 & -1 & -1 & +1 \\ +1 & +1 & -1 & +1 & -1 & -1 & +1 & -1 \end{pmatrix} \quad (1)$$

The PN-series random-number data PN is generated so that its sum is statistically zero. Next, embedding information DC is processed by performing a spread spectrum method, using the random-number data PN having the properties indicated by expression (1). In other words, when the polarity of the embedding information DC is "1", by using the pattern of the random-number data PN without changing it, a digital watermark pattern WM is expressed as follows:

$$PN = \begin{pmatrix} +1 & -1 & +1 & +1 & -1 & +1 & -1 & -1 \\ +1 & +1 & -1 & -1 & -1 & +1 & -1 & +1 \\ -1 & +1 & +1 & -1 & -1 & +1 & -1 & +1 \\ +1 & -1 & -1 & -1 & +1 & -1 & -1 & -1 \\ -1 & -1 & +1 & +1 & +1 & -1 & -1 & +1 \\ +1 & +1 & -1 & +1 & -1 & -1 & +1 & -1 \end{pmatrix} \quad (2)$$

When the polarity of the embedding information DC is "0", by using a pattern in which the random-number data PN is inverted, the digital watermark pattern WM is expressed as follows:

$$WN = -PN = \begin{pmatrix} -1 & +1 & -1 & -1 & +1 & -1 & +1 & +1 \\ -1 & -1 & +1 & +1 & +1 & -1 & +1 & -1 \\ +1 & -1 & -1 & +1 & +1 & -1 & +1 & -1 \\ -1 & +1 & +1 & +1 & -1 & +1 & +1 & +1 \\ +1 & +1 & -1 & -1 & -1 & +1 & +1 & -1 \\ -1 & -1 & +1 & -1 & +1 & +1 & -1 & +1 \end{pmatrix} \quad (3)$$

When the embedding information DC consists of a plurality of information bits, by dividing, for example, the brightness-signal frame data into appropriate smaller regions, the information bits may be set to correspond to the smaller regions. Also, by using, for example, a plurality of different digital watermark patterns that are orthogonal to one another, the information bits may be set to correspond to the digital watermark patterns. Alternatively, these techniques may be used in combination.

In addition, in a picture signal such as a digital video signal, it is assumed that frame data DV1 representing a pixel level of the brightness signal in certain frame data is expressed by the following expression. In the picture signal, close brightness signals appear to have a similar pixel level, and the pixel levels of adjacent pixels are appropriately set.

$$DV2 = DV1 + WM = \begin{pmatrix} 51 & 50 & 53 & 55 & 51 & 53 & 49 & 48 \\ 50 & 51 & 50 & 52 & 53 & 54 & 49 & 51 \\ 47 & 51 & 51 & 49 & 52 & 53 & 48 & 49 \\ 50 & 48 & 49 & 47 & 50 & 51 & 49 & 48 \\ 47 & 47 & 51 & 50 & 48 & 49 & 51 & 51 \\ 50 & 51 & 51 & 52 & 50 & 51 & 56 & 52 \end{pmatrix} \quad (4)$$

Digital watermark embedding is implemented by adding the digital watermark pattern WM to frame data DV1 of the brightness signal. When the polarity of the digital embedding information DC is "1", the digital watermark pattern WM expressed by expression (2) is added to the brightness signal expressed by expression (4). Frame data DV2 in which the digital watermark pattern WM is imbedded is expressed as follows:

$$DV1 = \begin{pmatrix} 50 & 51 & 52 & 54 & 52 & 52 & 50 & 49 \\ 49 & 50 & 51 & 53 & 54 & 53 & 50 & 50 \\ 48 & 50 & 50 & 50 & 51 & 52 & 49 & 48 \\ 49 & 49 & 50 & 48 & 49 & 50 & 50 & 49 \\ 48 & 48 & 50 & 49 & 47 & 50 & 52 & 50 \\ 49 & 50 & 52 & 51 & 51 & 52 & 55 & 53 \end{pmatrix} \quad (5)$$

In order to detect embedding information DC from frame data DV2 of the brightness signal in which the digital watermark pattern WM is embedded, PN-series random-number data PN identical to that used for embedding is used. The inner product P1 of original frame data DV1 of the brightness signal and random-number data PN has a value expressed as follows:

$$P1 = DV1 \cdot PN = 1 \quad (6)$$

Based on the statistical properties of the picture signal, the inner product P1 is a value close to zero. The inner product P2 of the frame data DV2 of the brightness signal in which digital watermark pattern WM is embedded and random-number data PN has, when the polarity of embedding information DC is "1" a value expressed as follows:

$$\begin{aligned} P2 &= DV2 \cdot PN \\ &= (DV1 + WM) \cdot PN \\ &= (DV1 + PN) \cdot PN \\ &= P1 + PN2 \\ &= 1 + 48 \end{aligned} \quad (7)$$

When the polarity of the embedding information DC is "0", the inner product P2 has a value expressed as follows:

$$\begin{aligned} P2 &= DV2 \cdot PN \\ &= (DV1 + WM) \cdot PN \\ &= (DV1 - PN) \cdot PN \\ &= P1 - PN2 \\ &= 1 - 48 \end{aligned} \quad (8)$$

In other words, the absolute value of the inner product P2 is a value close to the random-number data PN itself. For each of several pictures, by calculating the inner product P1 of original frame data DV1 of the brightness signal and random-number data PN, and the inner product P2 of the frame data DV2 of the brightness signal in which the digital watermark pattern WM is embedded and random-number data PN, the distributions of inner products P1 and P2 can be represented by the probability density function shown in FIG. 1. Accordingly, by setting an appropriate threshold value TH, which is not negative, it can be determined whether or not digital watermark information is embedded as the digital watermark pattern WM, and it can be determined whether the polarity of the information is positive or negative, as shown below:

When P2≦−TH, watermark information is embedded (polarity "0").

When |P2|<TH, no watermark information is embedded.

When P2≦TH, watermark information is embedded (polarity "1"). (9)

As the above expression (9) shows, the embedded information DC can be detected from frame data D2 of the brightness signal in which digital watermark pattern WM is embedded.

For the actual implementation of digital watermarking, two points are important: one is reliability of the digital watermark detection and the other is the influence on the picture quality of the digital watermark information. In order to accurately determine whether or not watermark information is embedded, a threshold value TH must be set so that, in FIG. 1, the probability density function when the digital watermark pattern WM is embedded and the probability density function when the digital watermark pattern WM is not embedded can be separated with good precision. However, actually, the skirts of both functions overlap with each other, so that it is difficult to select a threshold value TH that enables determination of whether or not the digital watermark pattern WM is embedded. The probability that it may be determined that digital watermark information is embedded, even though the information is not embedded, is called a "false positive value". To guarantee secure distribution of content, an extremely small false positive value is required. Accordingly, to increase the reliability of digital watermark detection, a process that uses nonnegative scalar value C to increase the intensity of the embedded digital watermark information is executed. Frame data DV2 of the brightness signal generated when digital watermark information is embedded using the embedding intensity increased by using scalar value C has a value expressed as follows:

$$DV2 = DV1 + CWM \quad (10)$$

The inner product P2 of the watermark-embedded frame data DV2 and the random-number data PN may be sufficiently increased. Specifically, the watermark-embedded frame data DV2 has a value expressed as follows:

$$\begin{aligned} P2 &= DV2 \cdot PN \\ &= (DV1 + CWM) \cdot PN \\ &= (DV1 \pm CPN) \cdot PN \\ &= P1 \pm CPN2 \end{aligned} \quad (11)$$

When the embedding intensity is increased as described above, the influence on the digital watermark picture quality cannot be ignored. The reliability of digital watermark detection and the influence on the picture quality of the watermark information are in a trade-off relationship.

The embedded digital watermark information must be correctly detected even if a digital-watermark-embedded picture is attacked by various techniques such as picture-format conversion, digital-to-analog conversion, MPEG compression, filtering, clipping, resizing, and rotation. There is a possibility that those who unlawfully steal copyright may maliciously attack digital-watermark-embedded pictures. Accordingly, various techniques have been proposed to enhance the resistance to these attacks, and to ensure the reliability of digital watermark detection. Nevertheless, a digital watermarking technology having strong resistance to all types of attacks has not been developed yet, and prompt measures are required.

FIG. 2 illustrates embedding of copy control information by using digital watermark information and copy control based on digital watermark detection.

When a digital video signal DV as a video source is transmitted from a broadcasting station or the like by using a medium such as satellite, terrestrial waves, or cable, a digital watermark embedding device 1 adds digital watermark information DC to the digital video signal DV, and transmits the obtained signal. The digital watermark information DC to be embedded includes video-source copyright information, and "Copy Once" information indicating that content may be copied once.

When the digital video signal DV that is transmitted after the "Copy Once" information (digital watermark information DC) is embedded therein by digital watermarking is received and played back by a set-top box or the like, the embedded digital watermark information DC is detected from the playback video signal by a digital watermark detecting device 3 built into a recording apparatus 2.

When the detecting device 3 in the recording apparatus 2 detects the "Copy Once" information, the digital watermark information DC is rewritten and recorded on an optical disk 5 by a digital watermark rewriting device 4 built into the recording apparatus 4. The rewritten digital watermark information DC includes video-source copyright information, and "No More Copy" information indicating that no further copies of the content can be made.

When the optical disk 5 on which a copy of the digital video signal DV is recorded as described above is provided, for example, as a commercially distributed medium, if someone attempts to copy the content of the provided optical disk 5 by a recording apparatus 6 again, another digital watermark detecting device 3 built into a recording apparatus 6 detects the embedded digital watermark information DC from the played back digital video signal DV.

Since the detected digital watermark information DC is the "No More Copy" information, indicating that no more copies of the content may be made, the recording apparatus 6 performs a process in accordance with the "No More Copy" information, that is, it stops recording the digital video signal DV on the optical disk 7. This is used for copy generation management.

Also, when the digital watermark embedding device 1 produces an optical disk 8 storing the digital video signal DV as a video source, it can execute the process of recording content to the optical disk 8 after embedding, in the digital video signal DV, digital watermark information DC having "Never Copy" information indicating that content is prohibited from being copied.

When the optical disk 8 on which the digital video signal DV is recorded is commercially distributed, if someone attempts to play back the content of the distributed optical disk 8 and copy it to another recording medium, the digital watermark detecting device 3 in the recording apparatus 6 detects the embedded digital watermark information DC from the played back digital video signal DV.

Since the detected watermark information DC is the "Never Copy" information indicating that content is prohibited from being copied, the recording apparatus 6 performs a process in accordance with the "Never Copy" information, that is, it stops recording to the optical disk 8. This prevents unauthorized copying.

In order to prevent a digital watermark from affecting the picture quality while ensuring the reliability of watermark detection, a digital watermark embedding technique that effectively uses human visual characteristics has been proposed. However, a method adapted for superimposing a watermark pattern on a picture while following the motion of the picture has not yet been implemented.

SUMMARY OF THE INVENTION

The present invention is made in view of the above-described problems, and it is an object of the present invention to provide a digital watermark embedding device and method in which, when digital watermark information is embedded in a picture, by detecting the motion of the picture, the watermark information is embedded so to be imperceptible to the human eye while ensuring the reliability of watermark detection.

It is a more specific object of the present invention to provide a digital watermark embedding device and method that, by optimizing a digital watermark pattern in accordance with the stationary or moving state of a picture, digital watermark information is embedded so to be imperceptible to the human eye while ensuring the reliability of watermark detection.

To these ends, according to an aspect of the present invention, a digital watermark embedding device is provided which includes a digital-watermark-pattern generating unit which generates a digital watermark pattern based on embedding information, a motion-detecting unit which, based on the result of predetermined evaluation of motion vectors detected in units of blocks which are obtained by dividing a picture signal to be digitally watermarked, outputs a motion of the picture signal, a modulating unit which modulates the digital watermark pattern so as follow the motion, and an embedding unit which embeds the modulated digital watermark pattern in the picture signal.

According to another aspect of the present invention, a digital watermark embedding method is provided which includes a digital-watermark-pattern generating step for generating a digital watermark pattern based on embedding information, a motion-detecting step for, based on the result of predetermined evaluation of motion vectors detected in units of blocks which are obtained by dividing a picture signal to be digitally watermarked, outputting a motion of the picture signal, a modulating step for modulating the digital watermark pattern so as follow the motion, and an embedding step for embedding the modulated digital watermark pattern in the picture signal.

As is clear from the above description, according to the present invention, for input-digital-video-signal processing, motion detection is performed for temporally sequential input digital video signals, and based on the detected motion information, when a still picture is represented, a digital watermark pattern is also controlled to be stationary, and when a moving picture is represented, the digital watermark pattern is also moved to follow the motion. This makes it possible to superimpose digital watermark information on an input digital video signal so as not be visually noticeable, whereby the digital watermark information can be effectively prevented from affecting the picture quality, without changing embedding intensity for the entire picture.

According to the present invention, for input-digital-video-signal processing, motion detection is performed using block correlation after performing, on an input digital video signal, preprocessing such as temporally sequential input digital video signals, and pieces of motion information which are calculated for blocks are evaluated by using determination by majority and weighting. Based on the detected motion information, by moving a digital watermark pattern to follow a picture, digital watermark information can be superimposed on the input digital video signal so as to match human visual characteristics by using a technique such as emphasizing a portion on which the human eye is easily turned.

According to the present invention, for input-digital-video-signal processing, motion detection is performed after performing, on an input digital video signal, preprocessing such as temporally sequential input digital video signals, and based on the detected motion information, by moving a digital watermark pattern to follow a picture, the digital watermark information can be highly efficiently superimposed on the input digital video signal while the number of calculations is reduced.

According to the present invention, video-signal motion detection enables embedding of digital watermark information controlled to follow the motion. Therefore, in the content distribution on the digital network age, a highly reliable copyright protection system having reduced picture-quality deterioration can be formed, so that, also in HD-picture-content distribution initiated in future digital broadcasting, etc., highly efficient superimposition of digital watermark information can be realized.

Further objects, features and advantages of the present invention will become apparent from the following description of the preferred embodiment with reference to the attached drawings.

BRIEF DESCRIPTION OF THE DRAWINGS

FIGS. 6A, 6B, 6C, 6D, 6E, 6F, 6G, and 6H are illustrations of a process of division into blocks in the digital watermark embedding device of the present invention;

FIGS. 7A, 7B, 7C, 7D, 7E, 7F, 7G, and 7H are illustrations of a process of division into blocks in the digital watermark embedding device of the present invention;

DESCRIPTION OF THE PREFERRED EMBODIMENTS

A digital watermark embedding device and method of the present invention are described below with reference to the attached drawings.

First Example of Digital Watermark Embedding Device

Figure 3:
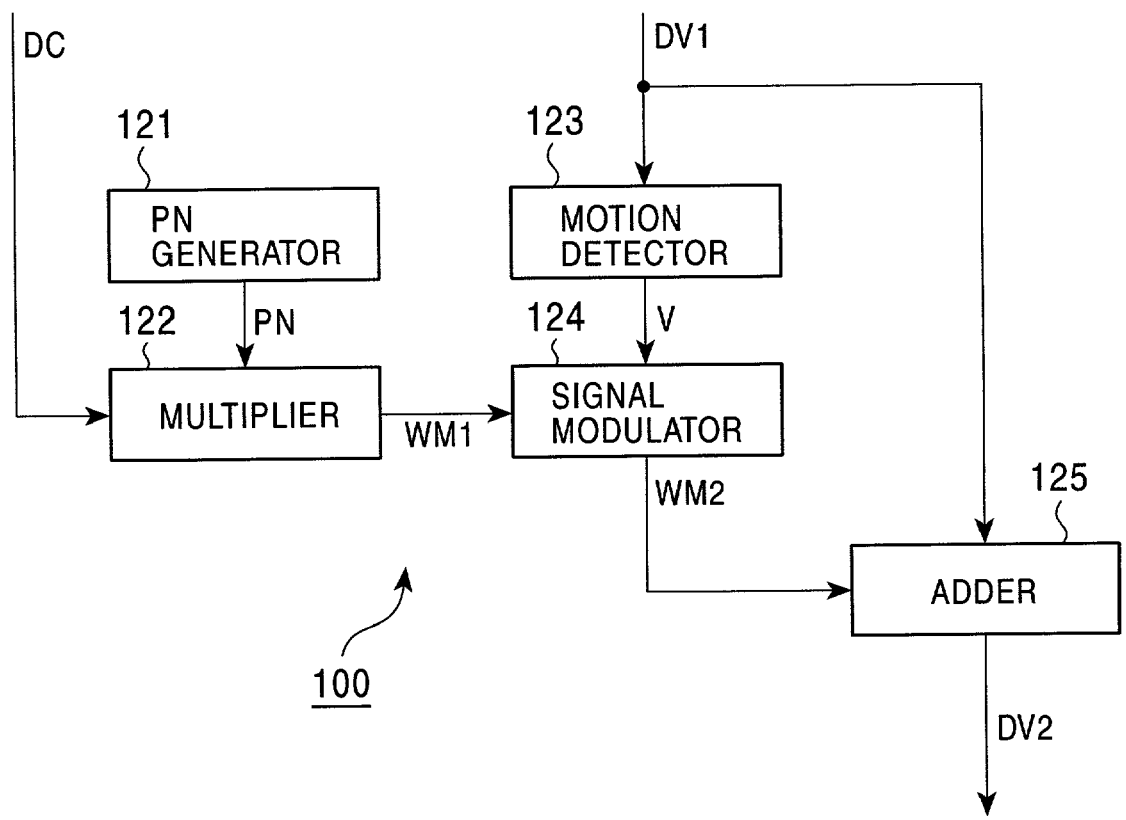
FIG. 3 is a block diagram showing a digital watermark embedding device of the present invention.

FIG. 3 shows the structure of a digital watermark embedding device 100 according to an embodiment of the present invention. In the digital watermark embedding device 100, PN-series random-number data PN is generated by a PN generator 121 and is used as a basic pattern to embed digital watermark information. Digital watermark embedding information DC is processed using random-number data PN by a spread spectrum method to generate a digital watermark pattern WM1 that is difficult to analyze.

The digital watermark embedding information DC includes, as information in accordance with a signal in which the digital watermark embedding information DC is embedded, copy control information representing one of "Copy Free" information indicating that content may be copied freely, "Copy Once" information indicating that content may be copied once, and "Never Copy" information indicating that content may never be copied.

In the digital watermark embedding device 100, a motion detector 123 detects a motion of a picture from a sequentially input digital video signal DV1 and outputs motion information V. The motion detection in the motion detector 123 is performed by analyzing an input picture by using a picture analyzing technique in which human visual characteristics are considered.

In the digital watermark embedding device 100 according to the embodiment of the present invention, based on the motion information V detected by the motion detector 123, by executing a process in which, when the picture is stationary, the digital watermark pattern WM1 is also controlled to be stationary, and when the picture is moving, the digital watermark pattern WM1 is also moved to follow the moving picture, the digital watermark information is embedded so to be imperceptible to the human eye. This can effectively prevent the digital watermark information from affecting the picture quality, without changing the intensity for the entire picture of embedding the digital watermark information.

Figure 4:
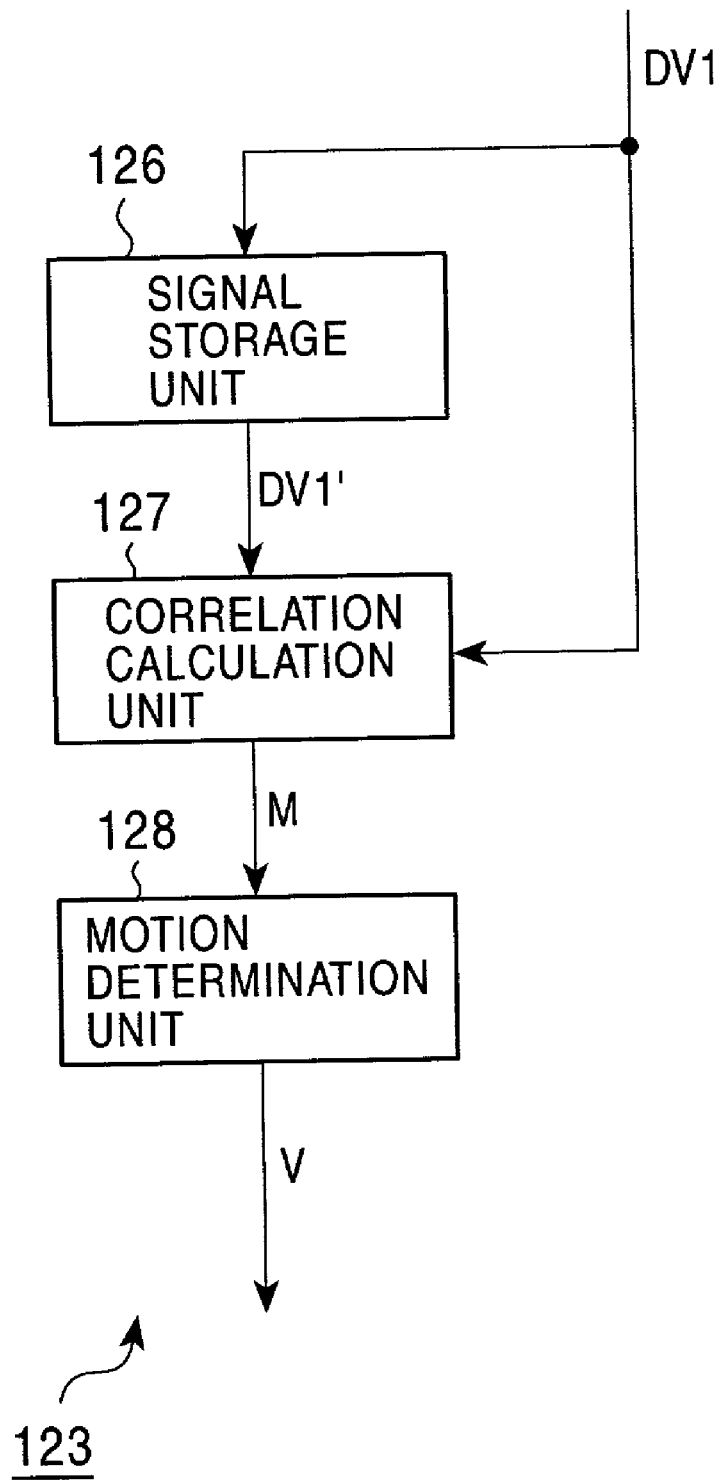
FIG. 4 is a block diagram showing the motion detector of the digital watermark embedding device shown in FIG. 3.

FIG. 4 shows the detailed structure of the motion detector 123 in the digital watermark embedding device 100. In the motion detector 123, a signal storage unit 126 stores the sequentially input digital video signal DV1 in units of frames, and outputs a delayed digital video signal DV1' that is delayed for a frame. In this embodiment, by using a feature in which two temporally sequential picture signals represent highly correlative pixel levels, a motion vector that maximizes frame correlation in an optimized search range is determined, whereby picture-signal motion detection is performed.

A correlation calculation unit 127 outputs correlation information M by calculating frame correlation between the delayed digital video signal DV1' output from the signal storage unit 126 and the input digital video signal DV1. In this embodiment, between pixels corresponding to two temporally sequential digital video signals DV1 and DV1', the absolute value of their brightness values is calculated, and the sum of matching values in a frame is used as an index of frame correlation. In other words, a matching value in the motion vector search range $(V_x, V_y)$ is expressed as follows:

$$M(V_x, V_y) = \Sigma |DV1'(x, y) - DV1(x+V_x, y+V_y)| \quad (12)$$

Next, after changing the motion vector search range, by repeatedly performing the calculation in expression (12), all matching values for motion vectors are calculated. This obtains a frame-correlation plane in the motion vector search range $(V_x, V_y)$.

Based on the correlation information M output from the correlation calculation unit 127, a motion determination unit 128 determines a motion vector $(V_x, V_y)$ in which the frame correlation is the maximum, and outputs motion information V. In other words, a motion vector $(V_x, V_y)$ that gives maximum correlation (the minimum matching value in this case) in the frame-correlation plane obtained in the correlation calculation unit 127 is output as motion information V. The motion information V is expressed as follows:

$$V(x, y) = \arg \min M(V_x, V_y) \quad (13)$$

Referring back to FIG. 3, the description of the digital watermark embedding device 100 is continued. The motion information V output from the motion detector 123 is input to a signal modulator 124. Based on the motion vector V, the signal modulator 124 modulates the digital watermark pattern WM1 to generate a digital watermark pattern WM2 in which human visual characteristics are considered. The digital watermark pattern WM2 is output to an adder 125.

When the input digital video signal DV1 represents a stationary state, the signal modulator 124 modulates the digital watermark pattern WM1 to generate the digital watermark pattern WM2 by regarding the digital watermark pattern WM1 as stationary in accordance with the motion information $V=(0, 0)$ which is output from the motion detector 123. When the input digital video signal DV1 represents a motion caused by the motion information $V=(V_x, V_y)$, the signal modulator 124 generates the digital watermark pattern WM2 by performing a modulating process in which the digital watermark pattern WM1 is moved to follow the picture in accordance with the motion information $V=(V_x, V_y)$ which is output from the motion detector 123. The digital watermark pattern WM2 is output to an adder 125. Specifically, based on the motion information V output as a value corresponding to picture moving speed and direction, the signal modulator 124 executes the process of modulating the digital watermark pattern WM1 so that it is moved to follow the moving picture represented by the motion vector. In this modulating process, a stationary digital watermark pattern can be embedded in a still picture, while a digital watermark pattern following a motion can be embedded in a moving picture, so that the digital watermark information can be embedded so to be imperceptible to the human eye. This can effectively prevent the digital watermark information from affecting the picture quality, without changing the intensity for the entire picture of embedding the digital watermark information.

The adder 125 outputs the digital video signal DV2 by adding the digital watermark pattern WM2 generated by modulating the digital watermark pattern WM1 to the input digital video signal DV1.

The digital video signal DV2 is transmitted in a form encoded by a predetermined encoder from a broadcasting station or the like by media such as satellite or terrestrial waves, and a cable, and is distributed in a form recorded on a recording medium such as an optical disk.

As described above, digital watermark information can be embedded so to be imperceptible to the human eye because the digital watermark embedding device 100 in FIG. 3 acquires motion information on a picture in which digital watermark information is embedded, and executes in accordance with the motion information a process of modulating a digital watermark pattern so that a stationary digital watermark pattern is added to a still picture, and for a moving picture, a digital watermark pattern is embedded so as to follow the motion. This can effectively prevent the digital watermark information from affecting the picture quality, without changing the intensity for the entire picture of embedding the digital watermark information.

Digital Watermark Embedding Process

Figure 5:
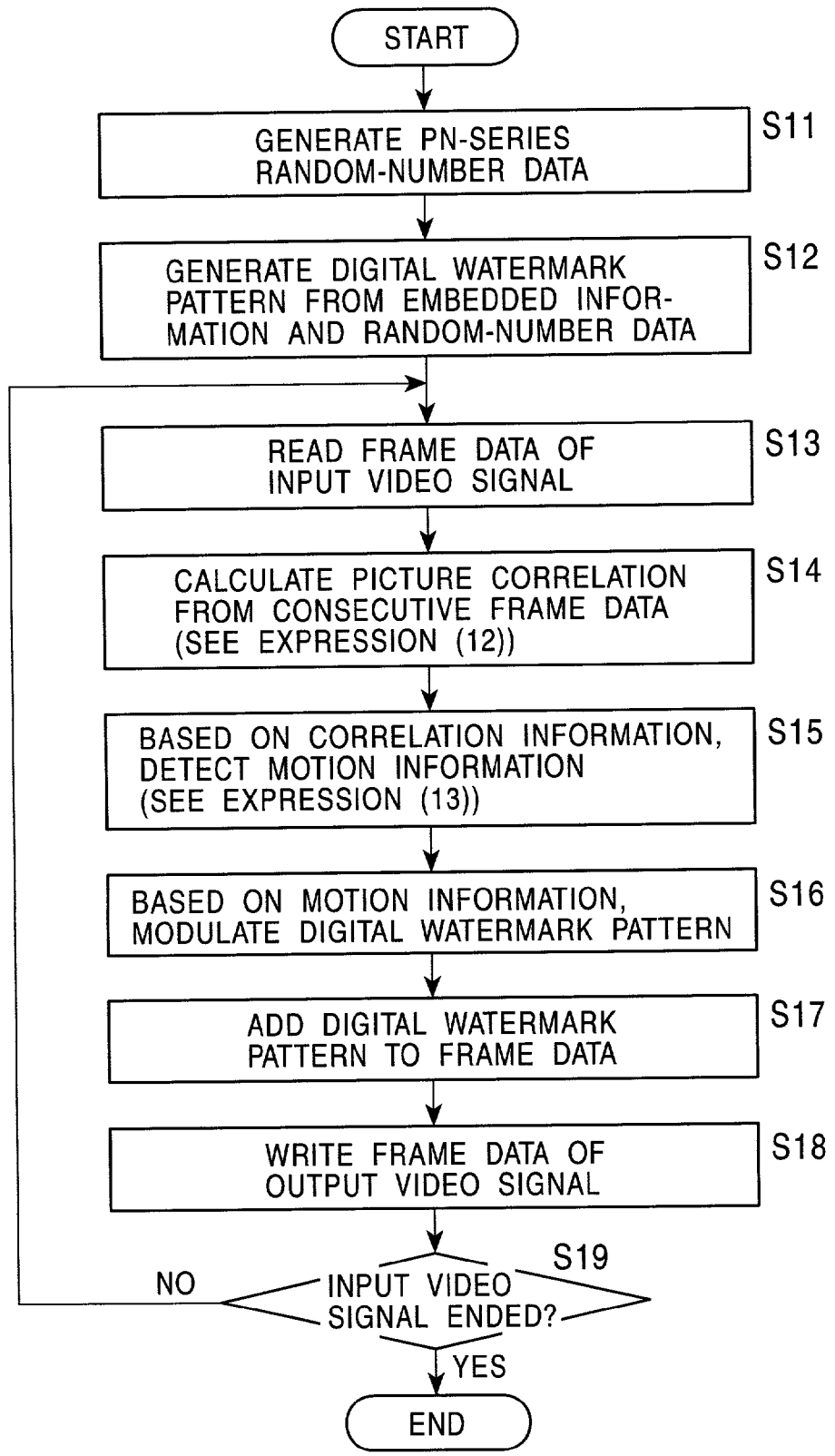
FIG. 5 is a flowchart showing an example of a process by the digital watermark embedding device of the present invention.

Next, a process performed in a digital watermark embedding device of the present invention is described below with reference to the flowchart shown in FIG. 5. FIG. 5 shows a process of the digital watermark embedding device that performs motion detection for an input signal such as an input digital video signal, modulates a digital watermark pattern in accordance with motion information, and embeds the modulated digital watermark pattern in the input signal. Steps constituting the process are described below.

In step S11, the digital watermark embedding device generates PN-series random-number data PN. In step S12, in accordance with the input signal as a signal in which digital watermark information is embedded, the digital watermark embedding device uses a spread spectrum method to process, by using the random-number data PN, embedding information (copy control information) representing one of "Copy Free" information, "Copy Once" information, and "Never Copy" information, whereby a digital watermark pattern WN1 is generated.

In step S13, the digital watermark embedding device sequentially reads the input digital video signal DV1 in units of frame data. In step S14, the digital watermark embedding device outputs correlation information M by calculating picture correlation for the temporally sequential input digital video signal DV1. In step S15, based on the correlation information M, the digital watermark embedding device detects a motion of the picture and outputs motion information V. Specifically, after generating a delayed digital video signal DV1' obtained by storing the input digital video signal DV1 in units of frames and delaying the stored signal for a frame, by using expression (12), based on two temporally sequential digital video signals DV1 and DV1', a frame-correlation plane in a motion vector search range $(V_x, V_y)$ is calculated, and a motion vector $(V_x, V_y)$ that gives maximum correlation is determined by using expression (13) and is output as motion information V.

In step S16, in the digital watermark embedding device, a digital watermark pattern WM2 in which human visual characteristics are considered is generated by modulating the digital watermark pattern WM1 based on the motion information V and is output. Specifically, based on the detected motion information V, when the input digital video signal DV1 represents a stationary state, the digital watermark pattern WM1 is also controlled to be stationary, and when the input digital video signal DV1 represents a moving state, the digital watermark pattern WM1 is also moved to follow the motion, whereby the digital watermark pattern WM2 is generated and output.

The digital watermark pattern WM2 generated by modulation is stationary when the input picture is stationary, while when the input picture is moving, the digital watermark pattern WM2 is moved to follow the motion, so that it is difficult for the digital watermark pattern WM2 to be perceived by the human eye. This can effectively prevent the digital watermark information from affecting the picture quality, without changing the intensity for the entire picture of embedding the digital watermark information.

Proceeding to step S17, the digital watermark embedding device adds the digital watermark pattern WM2 to the input signal. In step S18, a signal in which digital watermark information is embedded is output in a form identical to that of the input signal by the digital watermark embedding device.

In step S19, the digital watermark embedding device determines whether it has completed processing of the input signal. If the result of the determination is negative, the digital watermark embedding device returns to step S13 and repeatedly executes the following steps. If the result of the determination is affirmative, the digital watermark embedding device terminates the process.

Second Example of Digital Watermark Embedding Device

The above-described digital watermark embedding device is designed to perform motion detection by using picture-signal frame correlation. However, also in the digital-watermark-pattern adjusting process based on the frame correlation, the digital watermark pattern may be set so as not be noticeable.

For example, FIGS. 6A to 6H show motion detection in division into blocks when the picture signal represents horizontal shifting, and FIGS. 7A to 7H show motion detection in division into blocks when the picture signal represents zooming-out. FIGS. 6A to 6D and 7A to 7D show examples of pictures each having a plurality of motion vectors such as a running automobile, a house and a tree on a background, and a more backward landscape. When motion information is detected from temporally sequential picture signals representing the pictures shown in FIGS. 6A and 6B or FIGS. 7A and 7B by using frame correlation based on expressions (12) and (13), picture correlation of the entire frame is calculated. Thus, the detected motion information is greatly influenced by the motion vector of an object having a large area ratio.

Accordingly, for example, in the horizontal shifting case shown in FIGS. 6A and 6B, in the above technique, motion information caused by frame correlation is output depending on the area ratio. The digital watermark pattern depends on the motion vector of the backward landscape, in this case, almost on a motion vector representing a stationary state, and the motion information V greatly depends on a stationary motion vector. Thus, for example, if the digital watermark pattern is moved to follow the motion vector of the running automobile, the above technique cannot control the digital watermark pattern to perform a following operation.

In the zooming-out case shown in FIGS. 7A and 7B, the entire frame has only a unidirectional shift. Thus, if the digital watermark pattern is controlled to be stationary, it might be moved to follow a motion vector to some unexpected direction because the motion information caused by frame correlation depends on the area ratio. Accordingly, digital watermark information that can be visually perceived in normal observation conditions may be formed.

A digital watermark embedding device for solving the above problem is described below which executes a digital watermark embedding process by using motion detection utilizing picture-signal block correlation after performing picture-signal preprocessing such as division into blocks.

In the case shown in FIGS. 6A to 6H or 7A to 7H, first, by dividing the temporally sequential picture signals representing the pictures in FIGS. 6A and 6B or 7A and 7B into a plurality of picture blocks, the picture signals are converted into divisional picture signals (representing the pictures shown in FIGS. 6C and 6D or 7C and 7D) each having an appropriate block size. By using block correlation for each block in the divisional picture signals (representing the pictures shown in FIGS. 6C and 6D or 7C and 7D), and based on expressions (12) (matching-value calculation) and (13) (motion-information calculation), motion information (shown in FIG. 6E or 7E) in each block is detected. Although one frame picture is divided into nine blocks, the number of divisional blocks can be set to an arbitrary number.

The motion vectors of the divisional blocks are calculated, and predetermined evaluation of the calculated motion vectors is performed. Based on the result of the evaluation, optimal motion information (shown in FIG. 6F or 7F) on the entirety of the picture signal is set.

Methods for evaluating a plurality of motion vectors found in units of block regions can be variously set. By way of example, among a plurality of motion vectors, motion vectors having the majority of directions and sizes are selected. Information corresponding to the majority motion vectors is output as motion information V. Alternatively, for example, the average of a plurality of motion vectors is obtained and output as motion information V.

Based on the process of evaluating the motion vectors found in units of block regions in such a way that each motion vector representing a large motion is weighted to be large and each motion vector representing a small motion is weighted to be small, the motion information V is output.

Specifically, when a motion vector in one direction is calculated from the majority of the blocks or greater among the divisional blocks, a method of determining, by majority, that the motion vector is treated as motion information on the picture signal is used.

Also, for the motion vector calculated for each block, weighting for motion vector evaluation may be performed by using the magnitude of the motion vector. The human eye tends to be more easily turned on a region having a larger motion. When the motion vector is large, by weighting the motion vector to be large, picture-signal motion information in which a portion on which the human eye is easily turned is emphasized can be obtained.

In addition, for the motion vectors calculated for the blocks, by performing evaluation in such a way that each motion vector in the picture center is weighted to be larger and each motion vector in a picture periphery is weighted to be smaller, picture-signal motion information in which the picture center on which the human eye is easily turned can be obtained.

As described above, motion vectors are calculated in divisional block regions, and based on motion information obtained based on the evaluation of the calculated motion vectors, an embedding digital watermark pattern is adjusted. In this construction, for example, in the horizontal shifting case in FIGS. 6A to 6H, when the above-described frame correlation i used, the motion vector of the backward landscape is detected as picture-signal motion information, and an almost stationary digital watermark pattern is embedded. Conversely, when the method using detection of a plurality of motion vectors by using the block correlation in this embodiment is executed, and the motion vectors are evaluated in such a way that a moving portion on which the human eye is easily turned is emphasized, the picture-signal motion information (shown in FIG. 6F) that follows the running automobile is extracted and the digital watermark pattern following the running automobile is embedded.

In the zooming-out case shown in FIGS. 7A to 7H, when the above frame correlation is used, a motion vector in some unexpected direction is detected as picture-signal motion information, and embedding of a digital watermark pattern indicating a motion in the unexpected direction is performed. Unlike this case, by performing a block-correlation technique using detection of a plurality of motion vectors, for example, by employing a method based on determination by majority of evaluating motion vectors, motion information (shown in FIG. 7F) which is similar to a still picture and which is not moved to follow a motion in any direction can be extracted, so that an almost stationary digital watermark pattern is embedded.

As described above, in divisional block regions, by calculating each motion vector, and obtaining motion information based on evaluation of the calculated motion vectors, motion detection matching human visual characteristics can be performed. Also, by modulating the digital watermark pattern shown in FIG. 7H so that it is moved to follow a motion vector from which the original digital watermark pattern shown in FIG. 7G is acquired, and superimposing the modulated digital watermark pattern on a picture signal, the digital watermark pattern can be prevented from affecting the picture quality, so that digital watermark information can be embedded so as not to be visually noticeable.

FIGS. 6A to 6H and 7A to 7H illustrate cases in which the picture is divided into nine blocks. However, after dividing the picture into more blocks, by using block correlation in each object of the picture signal to perform motion detection, motion information of the picture signal may be performed.

Figure 8A:
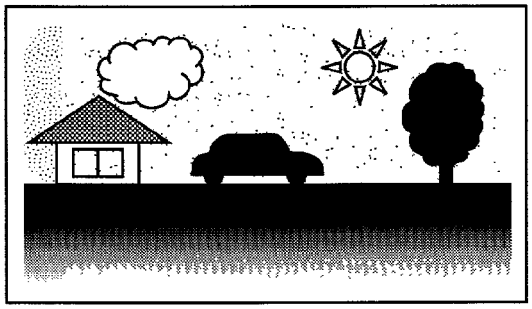
FIGS. 8A, 8B, 8C, 8D, 8E, 8F, 8G, and 8H are illustrations of a process of division into blocks in the digital watermark embedding device of the present invention.
Figure 8B:
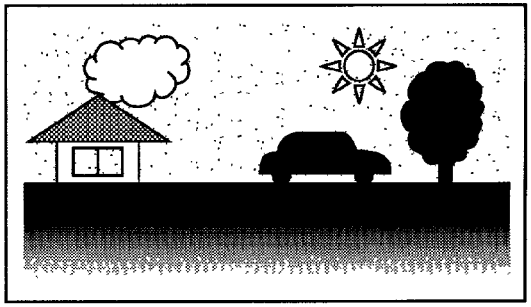

Similarly to the pictures shown in FIGS. 6A to 6H, FIGS. 8A to 8H illustrate a process in, when the picture signal represents horizontal shifting, the original picture is divided into minute blocks and the motion of each block is detected from the motion information of each block. First, temporally sequential picture signals representing the pictures shown in FIGS. 8A and 8B are divided into a plurality of minute blocks, and a motion-vector detecting process is executed for each block.

Figure 8C:
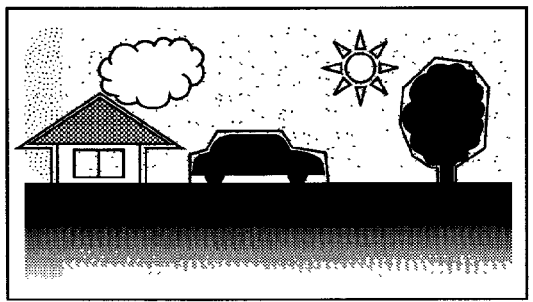
Figure 8D:
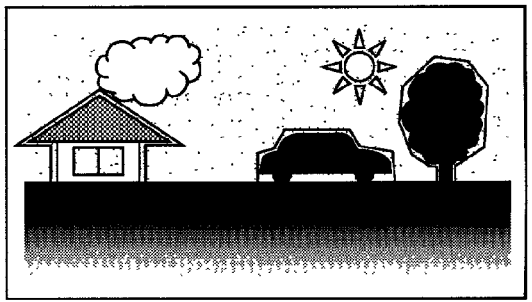
Figure 8E:
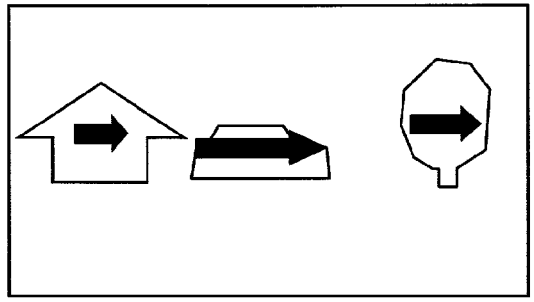

Specifically, the picture signals are divided into divisional picture signals which represent the pictures shown in FIGS. 8C and 8D and which have different block sizes. For the blocks of the divisional picture signals (FIGS. 8C and 8D), motion information (as shown in FIG. 8E) for each block is detected based on the above matching-value calculating expression (12) and the above motion-vector calculating expression (13) by using block correlation.

Figure 8F:
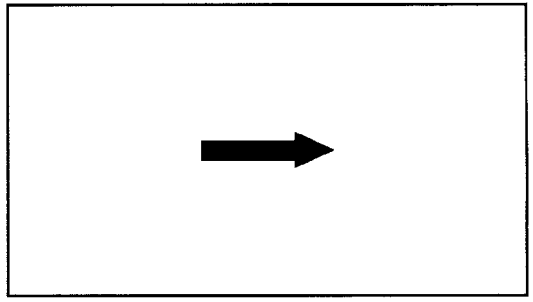
Figure 8G:
Figure 8H:
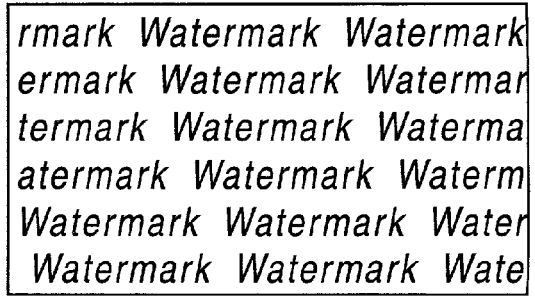

A plurality of blocks having motion vectors in a single direction, among a large number of motion vectors in the minute blocks, are collectively determined to be one object. As FIG. 8E shows, in the regions of the house, the automobile, and the tree, regions having almost similar motion vectors are extracted, in short, three objects having different motion vectors are extracted. Also, a plurality of motion vectors calculated for each object are evaluated, and as a result, optimal motion information (as shown in FIG. 8F) on the entirety of the picture signal is detected. In other words, picture regions having similar motion vectors are determined to be a single object region, and motion information based on the process of evaluating motion vectors in units of objects is output.

As described above, regarding the motion vector evaluation, a method that extracts vectors belonging a majority, and performs large weighting in accordance of a rule of majority or for each vector having the largest motion, or a method that weights the central portion of the picture to be large can be used. In addition, these methods for evaluation may be used in combination. Specifically, an evaluation method in which one in the central portion which has a larger motion is greater weighted may be used.

A digital watermark embedding device that executes the above-described digital watermark embedding process based on motion information obtained based on the motion information based on the evaluation of the calculated motion vectors can be realized by changing the structure of the motion detector 123 in the digital watermark embedding device 100 shown in FIG. 3.

Figure 9:
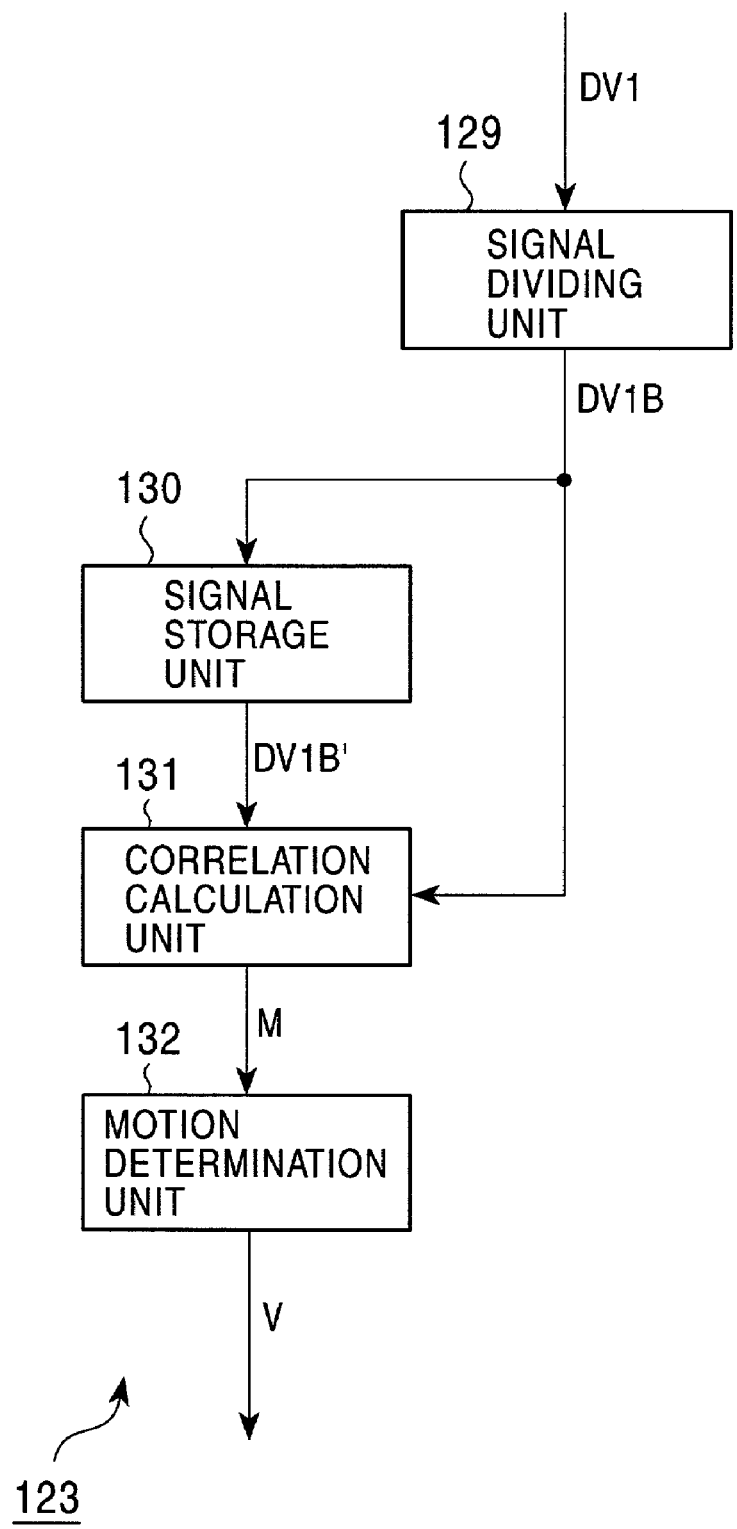
FIG. 9 is a block diagram showing a motion detector in the digital watermark embedding device of the present invention.
Figure 10A:
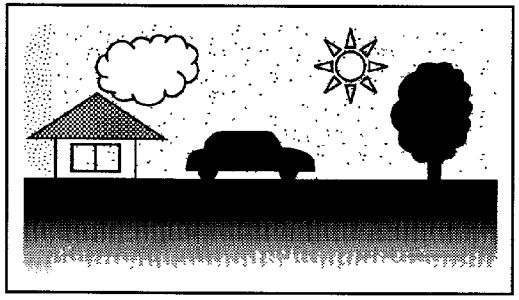
FIGS. 10A, 10B, 10C, 10D, 10E, 10F, 10G, and 10H are illustrations of a format converting process by the digital watermark embedding device of the present invention.
Figure 10B:
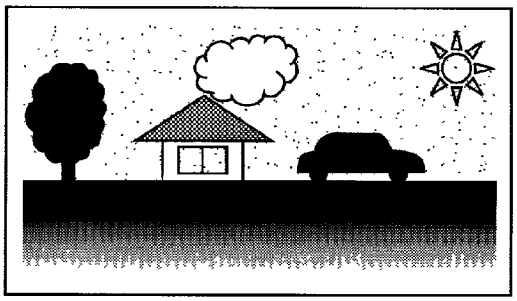
Figure 10C:
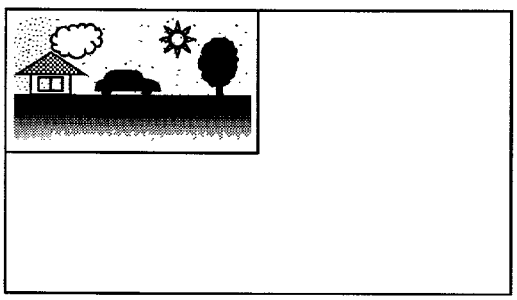
Figure 10D:
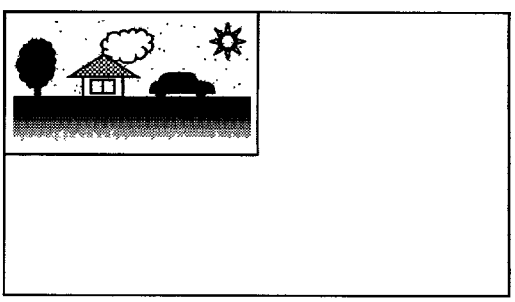
Figure 10E:
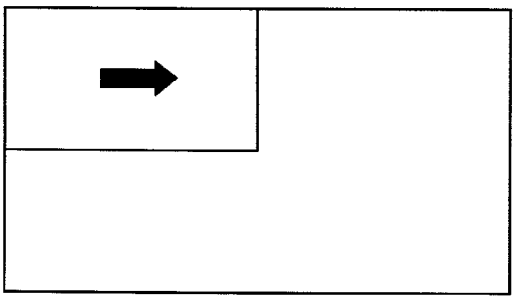
Figure 10F:
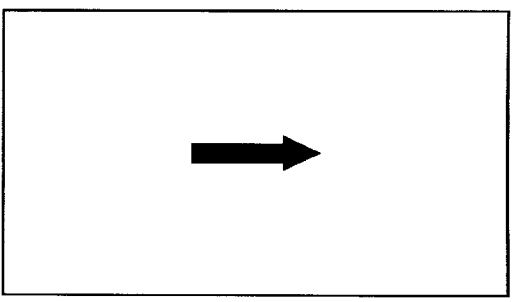
Figure 10G:
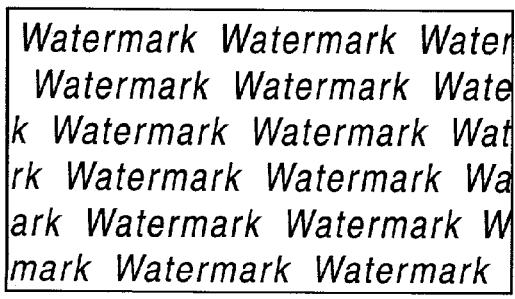
Figure 10H:
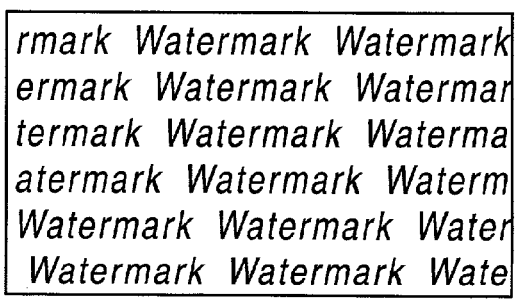

FIG. 9 is a block diagram showing the motion detector 123 (in the digital watermark embedding device 100) that uses picture-signal block correlation to perform motion detection after performing preprocessing such as division into blocks. In the motion detector 123, a signal dividing unit 129 divides a sequentially input digital video signal DV1 into a plurality of (e.g., n) blocks each having a proper size, and outputs each divisional digital video signal DV1B. Next, a signal storage unit 130 stores the divisional digital video signal DV1B for each frame, and outputs a delayed divisional digital video signal DV1B' that is delayed for a frame. Here, by using a feature in which two temporally sequential picture signals correspond to highly correlative pixel levels, and evaluating the motion vectors so that block correlation is the maximum for each of the n blocks in an optimally set search range, motion detection of picture signal is performed.

A correlation calculation unit 131 outputs correlation information M by calculating block correlation for each block between the delayed divisional digital video signal DV1B' (output from the signal storage unit 130) and the divisional digital video signal DV1B. Between the two temporally sequential digital video signals DV1B' and DV1B, a matching value in which the absolute values of differences between corresponding brightness values between corresponding pixels are totaled is calculated by using expression (12) and is used as a block-correlation index. Next, after changing the motion-vector search range, by repeatedly performing the calculation in expression (12), all the matching values for motion vectors are calculated. This makes it possible to obtain block-correlation planes for the n blocks in the motion-vector search range ($V_x$, $V_y$).

A motion determination unit 132 determines, based on the correlation information M output from the correlation calculation unit 131, each motion vector ($V_x$, $V_y$) in which block correlation is the maximum for each of the n blocks, and outputs motion information V by evaluating the determined motion vectors. In other words, in the block-correlation plane for each block which is obtained by the correlation calculation unit 131, n motion vectors ($V_x$, $V_y$) giving maximum correlation based on expression (13) are calculated.

Next, the motion determination unit 132 evaluates the n motion vectors ($V_x$, $V_y$) corresponding to the n blocks. For the evaluation, as described above, the determination-by-majority method, large weighting of one having the largest motion, large weighting of the picture central portion, etc., can be used.

By way of example, in the case of evaluation by the determination-by-majority method, when motion vectors in a single direction are calculated in a majority of the n divisional blocks, the motion vectors are set as picture-signal motion information V. Also, for the motion vector calculated for each block, when each block is weighted based on the magnitude of the motion vector for evaluation, calculation such as multiplications of the calculated motion vectors by a weighting coefficient and the totaling the products is performed. By performing digital watermark pattern adjustment based on the motion information V output by the above technique, picture-signal motion information in which each portion on which the human eye is easily turned is emphasized can be detected.

Alternatively, for the motion vectors calculated in the blocks, by weighting each block in the central portion of the picture to be larger, and weighting each block in the periphery of the picture to be smaller, the motion vectors can be evaluated. In this evaluation technique, picture-signal motion information in which the picture's central portion on which the human eye is easily turned is emphasized can be detected.

Vector Detecting Process Involving Picture Format Conversion

Motion information detection by using picture correlation requires a great number of calculations. The number of calculations using the matching-value calculating expression (12) is proportional to the product of a picture-signal frame size and a vector search range. This becomes a particular issue when motion detection from a high-definition picture signal is performed and digital watermark information is embedded. In order to detect motion vectors with good precision, it is important to implement a highly efficient motion-detecting algorithm.

A construction for solving the problem in that the number of calculations increases is described below. To solve the increase in the number of calculations, a picture signal is preprocessed such as format conversion, and motion detection is performed by using picture-signal frame correlation.

FIGS. 10A to 10H illustrate a format-reduced motion-detecting process performed when picture signals represent horizontal shifting. First, by performing picture-format reduction for temporally sequential picture signals (representing the pictures shown in FIGS. 10A and 10B), the picture signals are converted into reduced picture signals (representing the pictures shown in FIGS. 10C and 10D) each having a proper frame size.

By using frame correlation to process the reduced picture signals (representing the pictures shown in FIGS. 10C and 10D), motion vector, that is, motion information (shown in FIG. 10E) is calculated based on the matching-value calculating expression (12) and the motion-vector calculating expression (13). Even after being processed by this picture-format conversion, the two temporally sequential picture signals correspond to highly correlative pixel levels. In the reduced picture signals (FIGS. 10C and 10D), a motion vector in which frame correlation is the maximum in the optimally set search range is determined. By performing picture-format reduction in this way, a reduced number of calculations enables motion detection of picture signal. The motion information (FIG. 10E) as detected as described above is a motion vector from the reduced picture signal. By enlarging the motion information to its original scale, the original-picture-signal motion information (shown in FIG. 10F) can be obtained.

The example shown in FIGS. 10A to 10F shows a process of calculating one motion vector by executing the entire picture processing. Also in the cases shown in FIGS. 6A to 8H in which, by performing division into blocks, motion vectors for the blocks are calculated based on expressions (12) and (13), the number of calculations is reduced by executing calculating processing after performing picture-format conversion using the reducing process. A construction therefor is described later.

By way of example, when a picture signal is processed by picture-format conversion so that each of the horizontal and vertical sizes is reduced to ½, a reduced-picture-signal frame size can be reduced to (½)×(½)=¼ compared with the original-picture-signal frame size. By using this technique, in arithmetic operations using expression (12), the number of calculations required for motion detection is proportional to the product of the picture-signal frame size and the motion-vector search range. Thus, a quarter number of calculations enables highly efficient motion detection, so that high speed processing can be performed.

Because a settable motion-vector search range has a half precision in each of the horizontal and vertical directions due to picture-format reduction, it is required that, by reducing the picture-signal frame size in a range capable of insuring a practically sufficient detection precision, the number of calculations required for motion detection be reduced. By doubling the reduced-picture-signal motion information (FIG. 10E) detected as described above, the original-picture-signal motion information (FIG. 10F) is obtained, and by moving the original digital watermark pattern (shown in FIG. 10G) by the detected motion vector so as to be modulated into a digital watermark pattern (shown in FIG. 10H), and superimposing the digital watermark pattern on the picture signal, the digital watermark information can be effectively prevented from affecting the picture quality, and embedding of digital watermark is realized so as not to be noticeable.

Regarding picture-format reduction, in a range in which a practically sufficient detection precision can be ensured, more simplified format conversion is performed. For example, when a picture format is reduced so that the horizontal size is 1/m and the vertical size is 1/n, necessary format conversion may be performed by performing sample decimation so that the horizontal size is 1/m and the vertical size is 1/n. In addition, in a block having m horizontal pixels by n vertical pixels, format conversion may be performed by using arithmetic averaging or the like to calculate a new sample.

A digital watermark embedding device that calculates a motion vector after performing picture-format conversion, and executes digital watermark embedding based on motion information obtained based on the calculated motion vector, as described above, is realized by changing the structure of the motion detector 123 in the digital watermark embedding device 100 shown in FIG. 3.

Figure 11:
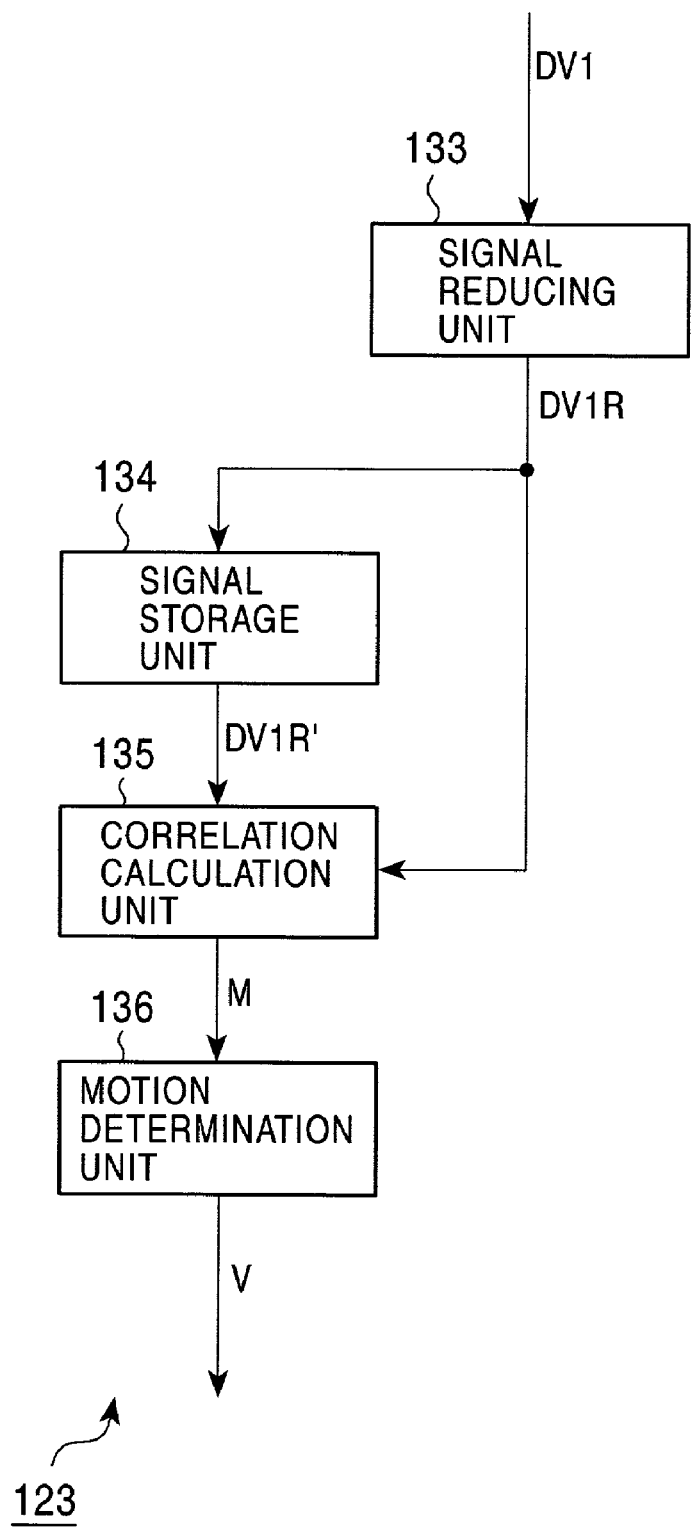
FIG. 11 is a block diagram showing a motion detector in the digital watermark embedding device of the present invention.

FIG. 11 is a block diagram showing the motion detector 123 (in the digital watermark embedding device 100) that performs motion detection by using picture-signal frame correlation after performing on the picture signal a preprocess such as format reduction. In the motion detector 123 shown in FIG. 11, a signal reducing unit 133 performs format conversion of a sequentially input digital video signal DV1 into a reduced picture signal DV1R having a proper frame size, and outputs the reduced picture signal DV1R. A signal storage unit 134 stores the reduced picture signal DV1R in units of frames, and outputs a delayed reduced picture signal DV1R' that is delayed for one frame. Here, by using a feature in which two temporally sequential picture signals correspond to highly correlative pixel levels, and evaluating the motion vectors so that block correlation is the maximum for each of the n blocks in an optimally set search range, motion detection of picture signal is performed.

A correlation calculation unit 135 outputs correlation information M by calculating block correlation for each block between the delayed divisional digital video signal DV1R' (output from the signal storage unit 133) and the divisional digital video signal DV1R. Between the two temporally sequential digital video signals DV1R' and DV1R, a matching value in which the absolute values of differences between corresponding brightness values between corresponding pixels are totaled is calculated by using expression (12) and is used as a block-correlation index. Next, after changing the motion-vector search range, by repeatedly performing the calculation in expression (12), all the matching values for motion vectors are calculated. This makes it possible to obtain block-correlation planes for the n blocks in the motion-vector search range $(V_x, V_y)$.

A motion determination unit 136 outputs motion information V by, based on the correlation information M output from the correlation calculation unit 135, determining a motion vector $(V_x, V_y)$ in which the frame correlation is the maximum. In other words, the motion determination unit 136 outputs, as the motion information V, the motion vector $(V_x, V_y)$, which gives the maximum correlation based on expression (13) in the frame-correlation plane obtained by the correlation calculation unit 135. In the optically set search range, by determining a motion vector that maximizes frame correlation between two temporally sequential reduced picture signals, picture-signal motion information can be highly efficiently detected, while the number of calculations is effectively reduced.

Digital Watermark Embedding Device for Performing Format Conversion and Division into Blocks A digital watermark embedding device that performs preprocessing a picture signal, such as format reduction, dividing the processed signal into a plurality of blocks as described above, calculating motion vectors for the blocks, and calculating motion information based on the motion vectors is described below. This digital watermark embedding device is realized by changing the structure of the motion detector 123 in the digital watermark embedding device 100 shown in FIG. 3.

Figure 1:
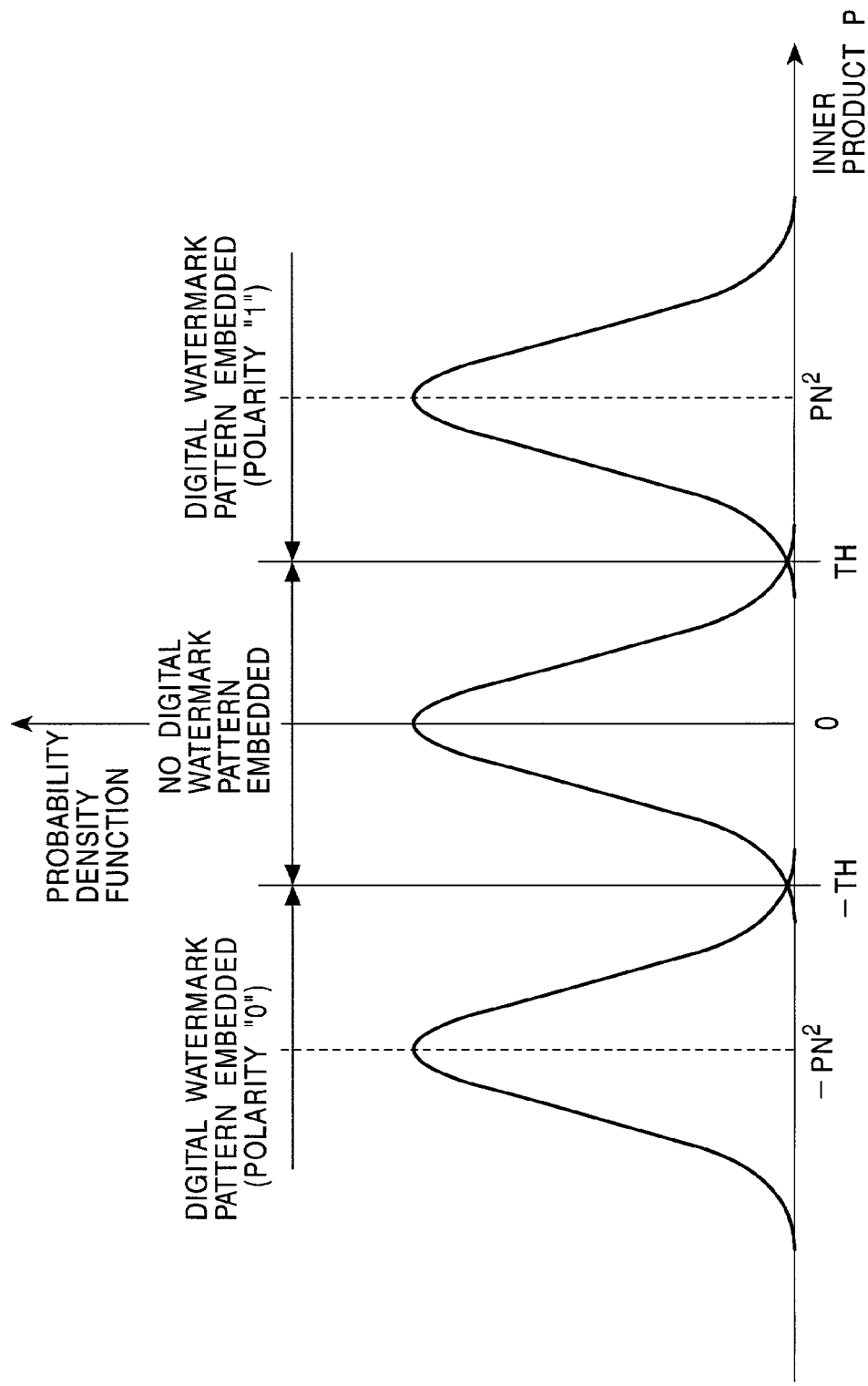
FIG. 1 is a graph which illustrates digital watermark detection and which shows the probability density functions of inner products.
Figure 2:
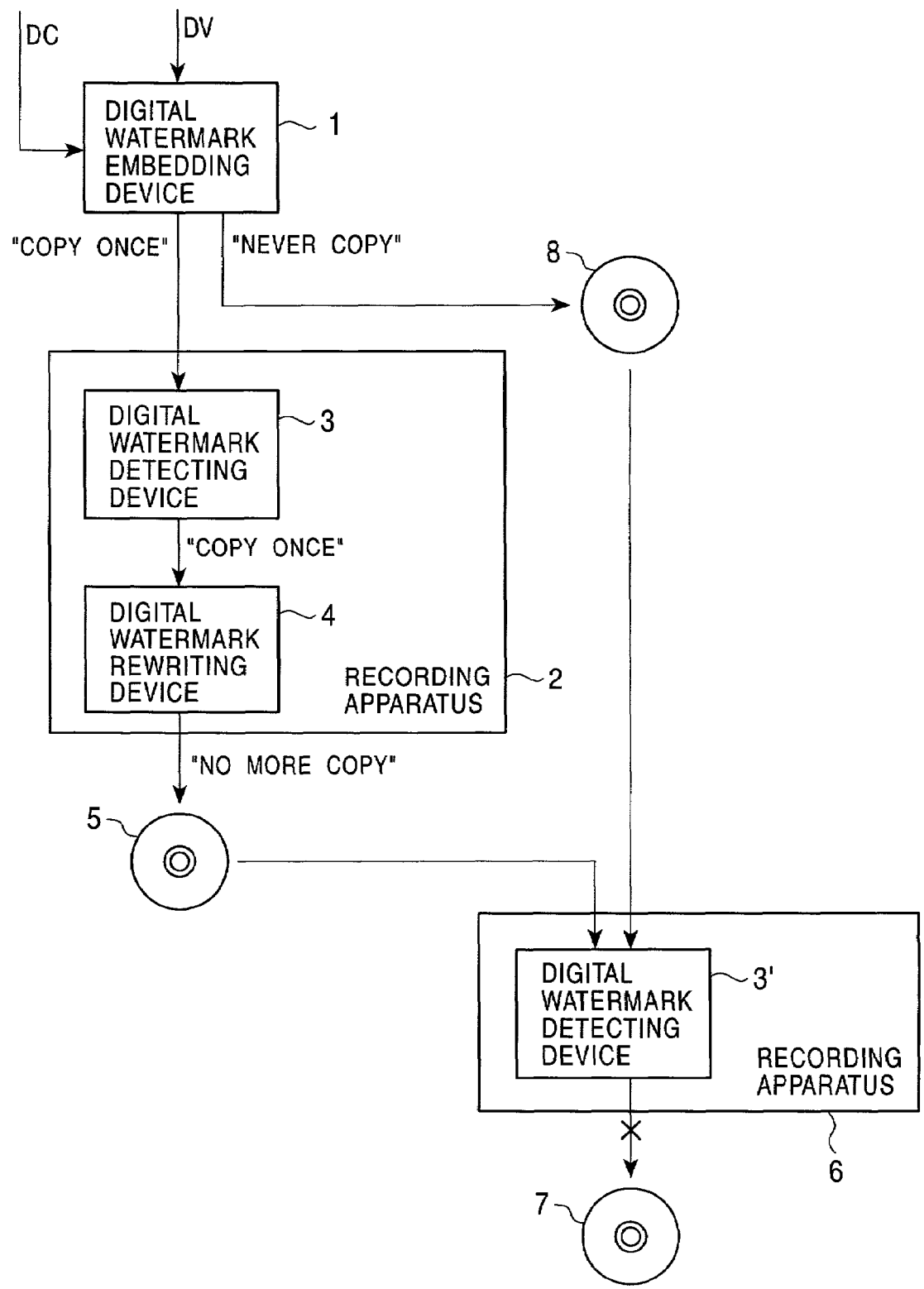
FIG. 2 is a block diagram showing a copyright protecting process using digital watermark embedding and detecting processes.
Figure 12:
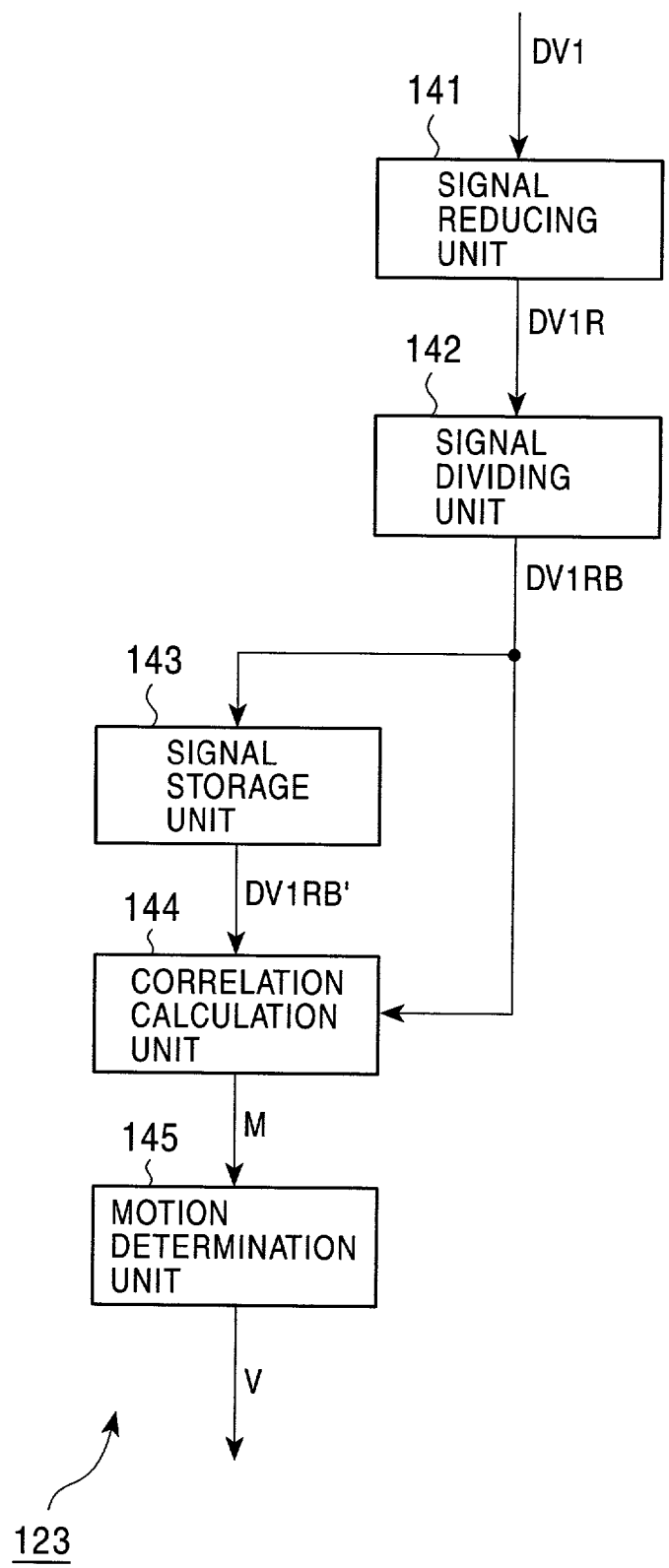
FIG. 12 is a block diagram showing a motion detector in the digital watermark embedding device of the present invention.

The structure of the motion detector 123 is described with reference to FIG. 12. In the motion detector 123 in FIG. 1, a signal reducing unit 141 performs format conversion of a sequentially input digital video signal DV1 into a reduced picture signal DV1R having a proper frame size, and outputs the reduced picture signal DV1R, and outputs the reduced video signal DV1R. The reduced picture signal DV1R is sequentially input to a signal dividing unit 142. By dividing the input video signal DV1R into a plurality of (e.g., n) blocks having a proper size, the signal dividing unit 142 outputs a divisional digital video signal DV1RB which is divided in units of blocks.

A signal storage unit 143 stores, for each frame, the reduced divisional video signal DV1RB output from the signal dividing unit 142, and outputs a delayed divisional video signal DV1RB' that is delayed for one frame. Here, by using a feature in which two temporally sequential picture signals correspond to highly correlative pixel levels, and evaluating the motion vectors so that block correlation is the maximum for each of the n blocks in an optimally set search range, motion detection of picture signal is performed.

A correlation calculation unit 144 outputs correlation information M by calculating block correlation for each block between the delayed divisional digital video signal DV1R' (output from the signal storage unit 143) and the divisional digital video signal DV1RB. Between the two temporally sequential digital video signals DV1R' and DV1R, a matching value in which the absolute values of differences between corresponding brightness values between corresponding pixels are totaled is calculated by using expression (12) and is used as a block-correlation index. Next, after changing the motion-vector search range, by repeatedly performing the calculation in expression (12), all the matching values for motion vectors are calculated. This makes it possible to obtain block-correlation planes for the n blocks in the motion-vector search range $(V_x, V_y)$.

A motion determination unit 145 determines, based on the correlation information M output from the correlation calculation unit 144, each motion vector $(V_x, V_y)$ in which block correlation is the maximum for each of the n blocks, and outputs motion information V by evaluating the motion vectors. In other words, in block-correlation planes corresponding to the blocks obtained by the correlation calculation unit 144, n motion vectors $(V_x, V_y)$ giving the maximum correlation are calculated based on expression (13).

Next, the motion determination unit 145 performs the n motion vectors $(V_x, V_y)$ corresponding to the n blocks. Usable methods for the evaluation include, as described above, determination by majority, large weighting of one having the largest motion, and large weighting of the central portion of the screen.

By way of example, in the case of evaluation by the determination-by-majority method, when motion vectors in a single direction are calculated in a majority of the n divisional blocks, the motion vectors are set as picture-signal motion information V. Also, for the motion vector calculated for each block, when each block is weighted based on the magnitude of the motion vector for evaluation, calculation such as multiplications of the calculated motion vectors by a weighting coefficient and the totaling the products is performed. By performing digital watermark pattern adjustment based on the motion information V output by the above technique, picture-signal motion information in which each portion on which the human eye is easily turned is emphasized can be detected.

Alternatively, for the motion vectors calculated in the blocks, by weighting each block in the central portion of the picture to be larger, and weighting each block in the periphery of the picture to be smaller, the motion vectors can be evaluated. In this evaluation technique, picture-signal motion information in which the picture's central portion on which the human eye is easily turned is emphasized can be detected.

As described above, in the construction that obtains motion information by using a reducing process to perform format conversion and obtaining motion vectors for divided block regions, the number to times the motion-vector calculating process is performed increases in accordance with the number of blocks. However, the reducing process can reduce the number of calculations, and optimal digital watermark adjustment and embedding can be performed without greatly increasing the number of calculations. Accordingly, picture-signal motion information can be efficiently detected and digital watermark information can be effectively prevented from affecting the picture quality, so that embedding of digital watermark information is realized in a form that is not visually noticeable.

Digital Watermark Embedding Process

Figure 13:
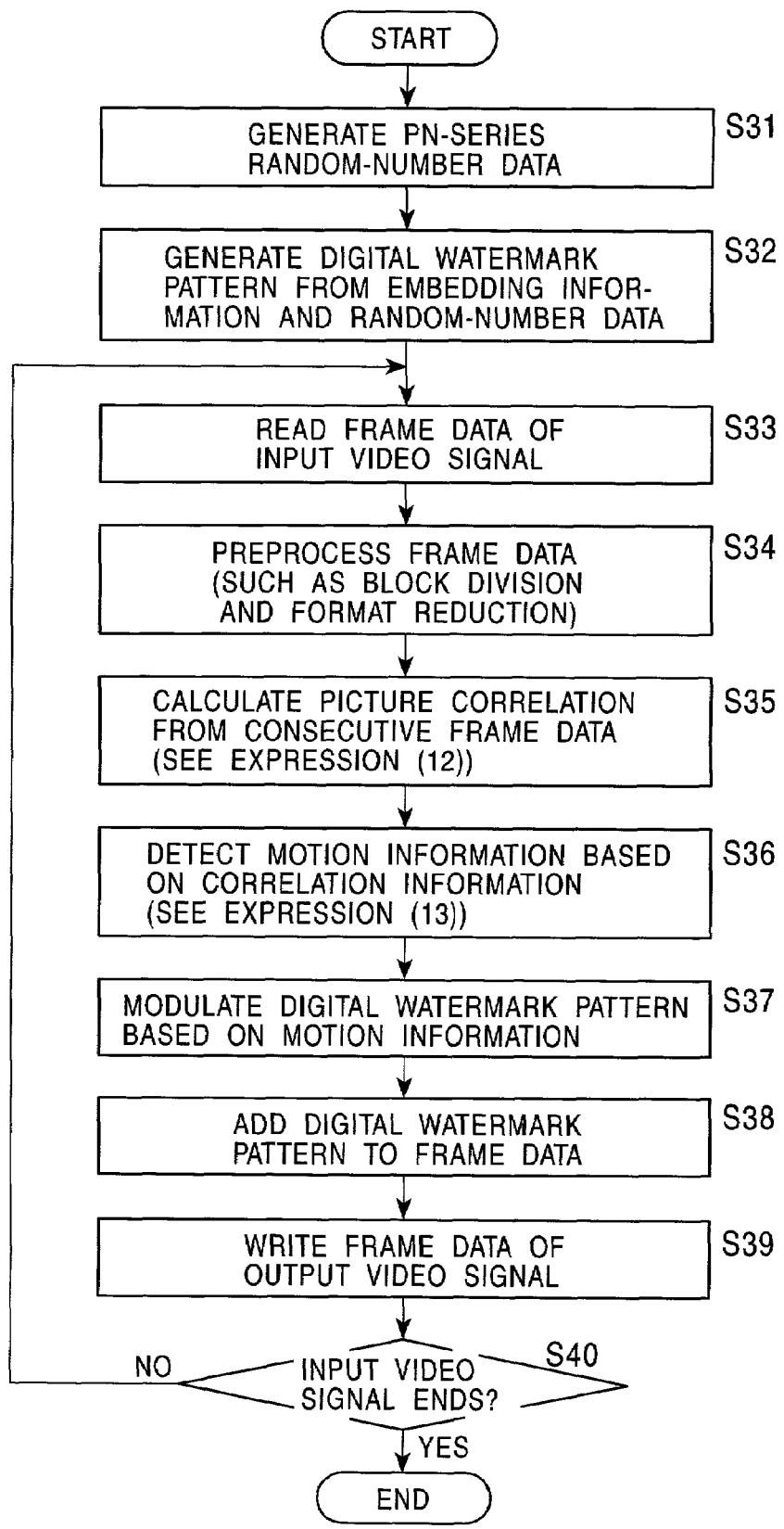
FIG. 13 is a flowchart showing a process performed by the digital watermark embedding device of the present invention.

Next, a process in a digital watermark embedding device that performs the above processing such as division into blocks or format conversion is described below with reference to the flowchart shown in FIG. 13. FIG. 13 shows a process performed by a digital watermark embedding device that performs motion detection for an input signal such as an input digital video signal, modulates a digital watermark pattern in accordance with motion information, and embeds the modulated digital watermark pattern in the input signal. Steps constituting the process are described below.

In step S31, the digital watermark embedding device generates PN-series random-number data. In step S32, in response to a signal in which digital watermark information is embedded, the digital watermark embedding device generates a digital watermark pattern WM1 by using random-number data PN to process, by a spread spectrum method, embedding information including copy control information such as "Copy Free" (indicating that content may be freely copied), "Copy Once" (indicating that content may copied once), and "Never Copy" indicating that content is prohibited from being copied.

In step S33, the digital watermark embedding device sequentially reads the input digital video signal DV1 in units of frames. In step S34, the input digital video signal DV1 is preprocessed. The preprocessing is performed as at least one process of the above-described division into blocks, and format conversion such as reduction, or a process of sequentially executing the two processes.

For example, in the preprocessing, the input digital video signal DV1 is divided into blocks, and a divisional digital video signal DV1B is output. The division into blocks enables picture-signal motion detection matching human visual characteristics. Alternatively, by performing format reduction on the input digital video signal DV1, a reduced digital video signal DV1R is output. By employing the preprocessing, a small number of calculations enables picture-signal motion detection. Otherwise, by performing format reduction on the input digital video signal DV1, the reduced digital video signal DV1R is output, and by dividing the input digital video signal DV1R into blocks, the divisional digital video signal DV1RB is output.

In step S35, by calculating picture correlation for the preprocessed, temporally-sequential digital video signal DV1R, DV1B, or DV1RB, correlation information M is output. In step S36, the digital watermark embedding device performs picture motion detection based on the correlation information M, and outputs motion information V.

By way of example, A delayed digital video signal DV1B' that is delayed for one frame is generated by storing the divisional digital video signal DV1B for each frame. Between two temporally sequential digital video signals DV1B' and DV1B, block-correlation planes for blocks in the motion-vector search range $(V_x, V_y)$ are calculated based on expression (12). Based on expression (13), motion vectors $(V_x, V_y)$ that give maximum correlations for the blocks are determined. By evaluating the motion vectors, motion information V is output.

Alternatively, by storing the reduced digital video signal DV1R for frames, the reduced digital video signal DV1R' that is delayed for one frame is generated. Between two temporally sequential digital video signals DV1R' and DV1R, block-correlation planes for blocks in the motion-vector search range $(V_x, V_y)$ are calculated based on expression (12). Based on expression (13), motion vectors $(V_x, V_y)$ that give maximum correlations for the blocks are determined. By evaluating the motion vectors, motion information V is output.

Otherwise, by storing the reduced divisional digital video signal DV1RB for frames, the delayed digital video signal DV1RB' that is delayed for one frame is generated. Between two temporally sequential digital video signals DV1RB' and DV1RB, block-correlation planes for blocks in the motion-vector search range $(V_x, V_y)$ are calculated based on expression (12). Based on expression (13), motion vectors $(V_x, V_y)$ that give maximum correlations for the blocks are determined. By evaluating the motion vectors, motion information V is output.

In step S37, based on the motion information V, by modulating the digital watermark pattern WM1, the digital watermark embedding device generates and outputs a digital watermark pattern WM2 in which human visual characteristics are considered. In other words, based on the detected motion information V, when it is found that the input digital video signal DV1 represents a still picture, the digital watermark pattern WM1 is also controlled to be stationary, and when it is found that the input digital video signal DV1 represents a moving picture, the digital watermark pattern WM1 is also moved to follow the motion, whereby the digital watermark pattern WM2 is generated and output. The digital watermark pattern WM2 modulated as described above is stationary when the input picture is stationary, and is moved when the input picture has a motion.

Proceeding to step S38, the digital watermark embedding device adds the digital watermark pattern WM2 to the input signal. In step S39, the digital watermark embedding device outputs, in a form identical to that of the input signal, a signal in which digital watermark information is embedded.

In step S40, the digital watermark embedding device determines whether it has completed input-signal processing. If the result of the determination is negative, the digital watermark embedding device returns to step S33, and repeatedly performs the subsequent steps. By repeatedly performing similar processing on each sequentially input signal, the input signal is processed. If the result of the determination is affirmative, the process ends.

According to a construction of the present invention in which, in blocks generated by division, motion vectors are calculated and motion information is obtained based on the calculated motion vectors, digital-watermark-pattern modulation can be performed based on motion detection matching human visual characteristics. By superimposing digital watermark information on a picture signal, the digital watermark information can be effectively prevented from affecting the picture quality, so that digital watermark embedding can be performed in a form that is not visually noticeable.

In addition, according to a construction of the present invention which calculates motion vectors from a picture obtained by performing format conversion such as picture reduction, the number of calculations required for calculating the motion vectors is reduced, thus achieving an increase in motion-vector calculating efficiency and an increase in digital-watermark-embedding efficiency.

Digital Watermark Detecting Device

Figure 14:
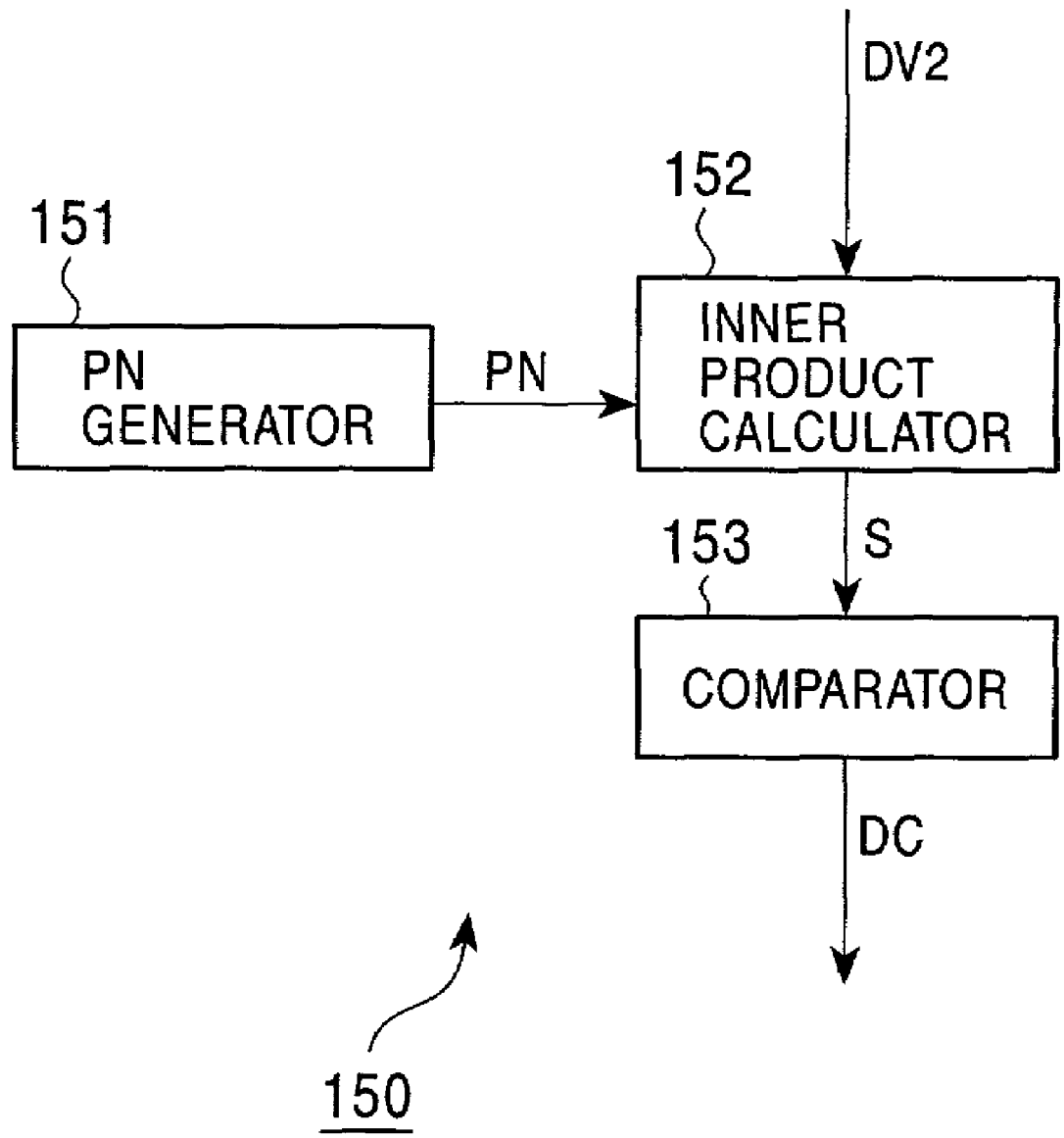
FIG. 14 is a block diagram showing a digital watermark detecting device of the present invention.

Next, the structure of a digital watermark embedding device is described below with reference to FIG. 14. The digital watermark detecting device 150 shown in FIG. 14 detects embedded digital watermark information DC from a digital video signal DV2 received via a medium such as satellite or terrestrial waves from a broadcasting station, or a cable, or from a digital video signal DV2 obtained by playing back an optical disk or the like.

In the digital watermark detecting device 150, a PN generator 151 generates PN-series random-number data PN, and performs watermark detection by using the random-number data PN as a basic pattern. By generating the PN-series random-number data PN, which is identical to that generated by the PN generator 121 or 141 in the digital watermark embedding device 100, the PN generator 151 performs correct detection of the digital watermark information DC that is embedded by the spread spectrum method so as not be analyzed.

In the digital watermark detecting device 150, the inner product S of the digital video signal DV, which is sequentially input, and the random-number data PN is calculated and output by an inner product calculator 152. By comparing the inner product S with an appropriately set threshold value, a comparison/determination unit 153 determines whether the digital watermark information DC is embedded, and determines, if the digital watermark information DC is embedded, the polarity of the embedded digital watermark information DC. Specifically, based on a nonnegative threshold value TH, the determination is made as follows:

When $S \leq -TH$, the digital watermark information DC is embedded (the polarity is "0").

When $|S| < TH$, the digital watermark information DC is not embedded.

When $S \geq TH$, the digital watermark information DC is embedded (the polarity is "1"). (14)

As indicated by expression (14), the digital watermark information DC can be detected from the input signal DV2.

By way of example, when copying the digital video signal DV2 received via the medium such as satellite or terrestrial waves from a broadcasting station, or a cable, or the digital video signal DV2 obtained by playing back an optical disk or the like, copy control can be performed based on the digital watermark information DC. In addition, for a source that may be unlawfully copied, the digital watermark detecting device 150 is designed to find out the origin of the source.

Digital Watermark Detecting Process

Figure 15:
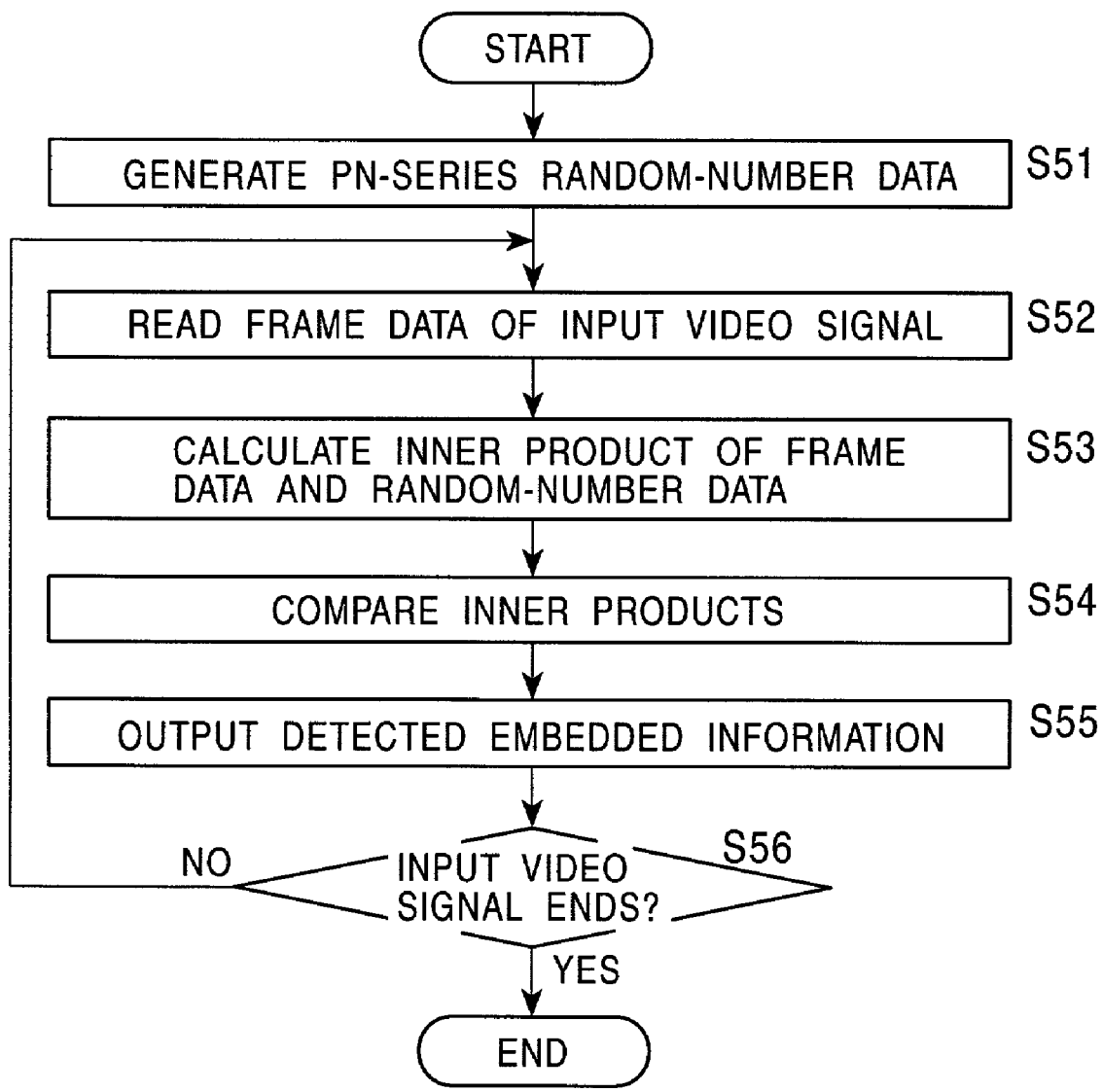
FIG. 15 is a flowchart showing a process performed by the digital watermark detecting device of the present invention.

Next, a process that the digital watermark detecting device 150 executes is described with reference to the flowchart shown in FIG. 15. The steps of the process are described below.

In step S51, the digital watermark detecting device 150 generates PN-series random-number data PN. In step S52, the digital watermark detecting device 150 sequentially reads frame data such as the digital video signal DV2. In step S53, the digital watermark detecting device 150 calculates the inner product S of the input frame data and the random-number data PN, and outputs the calculated inner product S.

In step S54, by comparing the inner product S with a set threshold value (TH), the digital watermark detecting device 150 determines whether the digital watermark information DC is embedded, and determines, if the digital watermark information DC is embedded, the polarity of the embedded digital watermark information DC. In other words, for the nonnegative threshold value TH, based on the determination in expression (14), the digital watermark information DC can be detected from the input signal. In step S55, the digital watermark detecting device 150 outputs the digital watermark information DC detected as described above.

Proceeding to step S56, the digital watermark detecting device 150 determines whether it has completed the processing of the input signal. If the result of the determination is negative, the digital watermark detecting device 150 returns to step S52, and processes the input signal by sequentially repeating similar steps for each input data. In step S56, if the result of the determination in step S56 is affirmative, the digital watermark detecting device 150 terminates the process.

System Configuration

Figure 16:
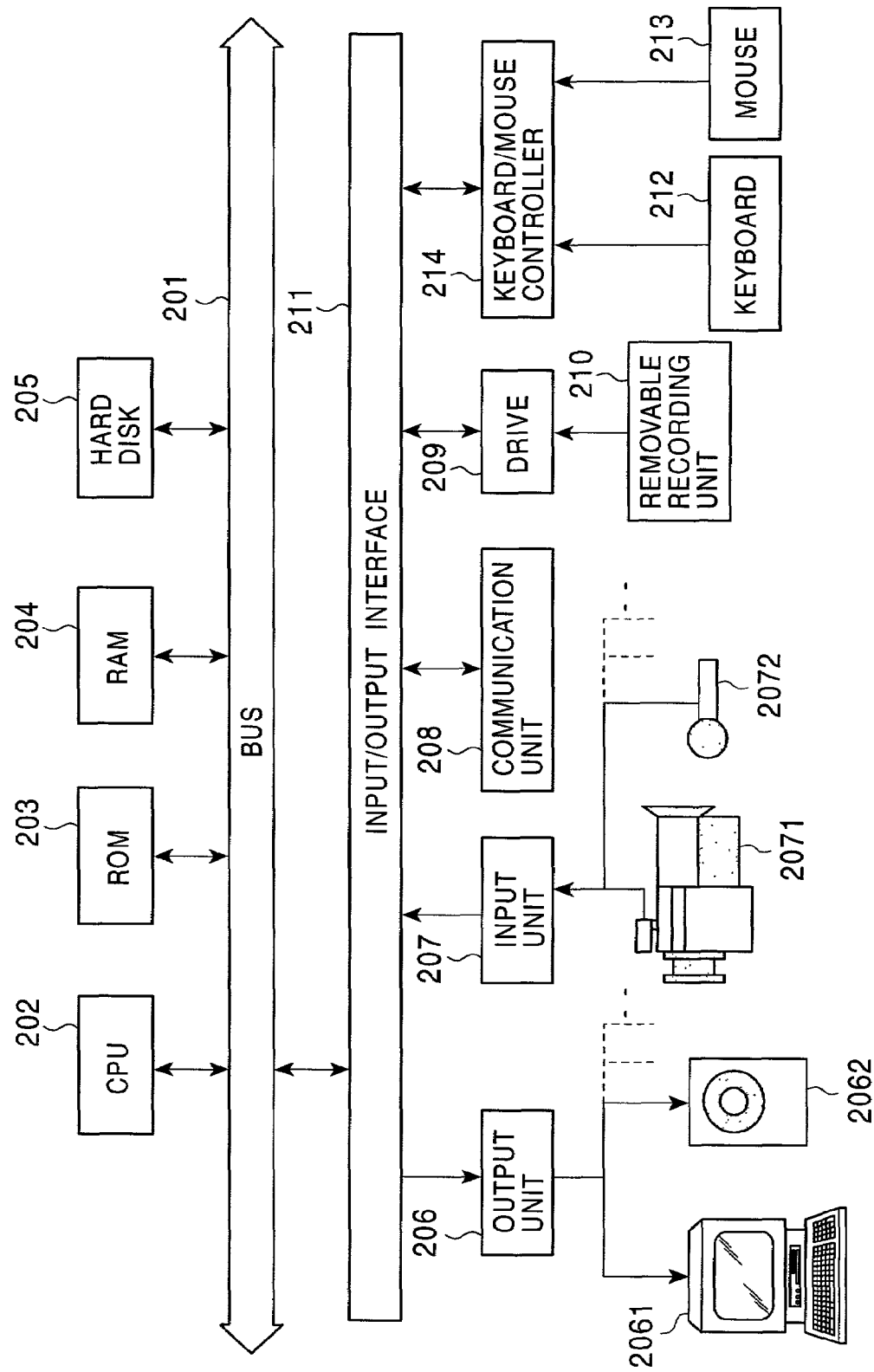
FIG. 16 is a block diagram showing an example of a system that executes at least one of digital watermark embedding and detection.

The above-described consecutive processing can be implemented by hardware, software, or a combination of both. For executing a process using software, it can be executed by installing, into a memory of a data processor built into dedicated hardware, a program containing a processing sequence, or by installing a program into a general-purpose computer that can execute various processes. For using software to execute the consecutive processing, programs constituting the software are installed into, for example, a general-purpose computer or a single-chip microcomputer. FIG. 16 shows an example of the system configuration of an apparatus that executes the consecutive processing, specifically, at least one of digital watermark embedding and digital watermark detection.

The system includes a central processing unit (CPU) 202. The CPU 202 actually executes various applications and an operating system. The system includes a read-only memory (ROM) 203. The ROM 203 stores a program executed by the CPU 202, or fixed data as arithmetic parameters. The system includes a random access memory (RAM) 204. The RAM 204 is used as a storage or work area for the program executed by the CPU 202, and parameters that change as required in program processing. The CPU 202, the ROM 203, the RAM 204, and a hard disk 205 are connected to one another by a bus 201, whereby data can be mutually transferred. In addition, data can be transferred from/to various input/output units connected to an input/output interface 211.

A keyboard 212 and a mouse 213 are operated by a user in order to input various commands and data to the CPU 202. The commands and data are input via a keyboard/mouse controller 214.

A drive 209 performs recording to or playback of a removal recording unit 210 such as a floppy disk, a compact-disk read-only memory (CD-ROM), a magneto-optical (MO) disk, a magnetic disk, or a semiconductor memory. The drive 209 performs playback of a program or data from each type of the recording unit 210, and performs storage of a program or data to each type of the recording unit 210.

When a command is input from the keyboard 212 or the mouse 213 to the CPU 202 via the input/output interface 211, the CPU 202 executes the program stored in the ROM 203 in accordance with the input command.

In the above embodiment, a signal for use in digital watermark embedding, or a signal for use in digital watermark detection can be input from an input device connected to an input unit 207, such as a camera 2071 or a data input device, for example, a scanner, or from the removal recording unit 210 connected to the drive 209. Audio data can be also input by using a microphone 2072. In addition, data that is received by a communication unit 208 can be used as data to which a digital watermark pattern is embedded or as data from which a digital watermark pattern is detected.

Not only a program stored in the ROM 203, but also a program stored in the hard disk 205, a program installed after the program is transferred from a satellite or a network and is received by the communication unit 208, or a program installed into the hard disk 205 after the program is read from the removal recording unit 210 when it is loaded into the drive 209 can be loaded into the RAM 204 and executed by the CPU 202.

In the system shown in FIG. 16, the CPU 202 performs processing in accordance with each modification of the above embodiment, each of the above block diagrams, or each of the above flowcharts. The CPU 202 uses, for example the input/output interface 211 to output the result of the processing to a display unit 2061 such as a liquid crystal display or a cathode-ray tube and to a speaker 2062 via an output unit 206. Also, processing data can be transmitted from the communication unit 208, and can be stored in a recording medium such as the hard disk 205.

Each process-executing program can be recorded beforehand in the hard disk 205 and the ROM 203 as recording media incorporated into the system. Alternatively, the program can be temporally or eternally stored (recorded) in the removal recording unit 210. The removal recording unit 210 can be provided as so-called "package software".

The program can be installed from the removal recording unit 210 into a computer. In addition, by using a digital broadcasting satellite to transfer the program from a download site to a computer by radio, or using a network such as a local area network or the Internet to transfer the program by wire, the computer can use the communication unit 208 to receive the transferred program and can install the program into the hard disk 205.

In this Specification, processing steps constituting each program for controlling the computer to perform each process do not always need to be processed in a temporally sequential order in the form of a flowchart, and include processes (e.g., parallel processes or object oriented processes) that are executed in parallel or separately.

The program may be processed by a single computer or may be processed in a distributed form by a plurality of computers. The program may be transferred and executed by a remote computer.

Although the above-described embodiment mainly describes a case in which, between two temporally sequential digital video signals, the absolute values of differences between corresponding pixels are calculated and totaled, the present invention is not limited to the case, but can be applied to a construction using mutual correlation in which the products of the brightness levels between corresponding pixels are calculated and totaled.

Although the above-described embodiment describes a case in which motion detection is performed by using picture correlation (matching) between two temporally sequential digital video signals, the present invention is not limited to the case, but can be applied to a construction in which motion detection is performed by using two temporally sequential digital video signals.

Although the above-described embodiment describes a case in which motion detection is performed by using picture correlation between two temporally sequential digital video signals, the present invention is not limited to the case, but motion detection may be performed by using picture correlation among three or more temporally sequential digital video signals. By using a processing construction that detects picture correlation among three or more temporally sequential digital video signals, motion detection having a small change in the time domain can be performed.

Although the above-described embodiment describes a case in which motion detection is performed by using picture correlation between two temporally sequential digital video signals, the present invention is not limited to the case, but can be widely applied to cases in which motion detection is performed in a simplified way by reducing a digital video signal if practically sufficient precision is ensured in the cases. This can simplify the entire construction.

Although the above-described embodiment describes a case that performs motion detection on frame signals of digital video signals, the present invention is not limited to the case, but can be widely applied to cases that perform motion detection on field signals of digital video signals. In these cases, motion detection may be performed for each field signal, or motion detection may be performed on the field signal of either. This enables motion detection based on a reduced number of calculations.

Although the above-described embodiment describes a case in which, for picture analyzing considering human visual characteristics, motion information is detected from a digital video signal and a digital watermark pattern is controlled to follow the motion information, the present invention is not limited to the case, but can be widely applied to a picture-analyzing case in combination with cases in which a digital video signal is modulated after detecting edge information, or the like, on the digital video signal, and in which various types of information, such as brightness information and color information on the digital video signal, are analyzed for processing.

Although the above-described embodiment describes a case in which a digital watermark pattern is generated by using random-number data to process copyright information by a spread spectrum method, and the digital watermark pattern is added to a digital video signal, the present invention is not limited to the case, but can be widely applied to various digital watermark embedding methods that perform digital watermark embedding on the base-band signal of a digital video signal, and various digital watermark embedding methods that perform digital watermark embedding on the bitstream signal of the digital video signal.

Although the above-described embodiment describes a case that uses PN-series random-number data to process copyright information by a spread spectrum, the present invention is not limited to the case, but can be widely applied to cases in which, by using various numeric patterns in which a statistic sum is zero, copyright information is modulated so as not be analyzed.

Although the above-described embodiment describes a case that superimpose copyright information, the present invention is not limited to the case, but can be widely applied to cases in which various types of information are superimposed, as required, before being transmitted.

The present invention has been fully described with reference to specified embodiments. However, it is obvious that a person skilled in the art can modify and substitute the embodiments without departing the gist of the present invention. In other words, the present invention has been disclosed in an exemplified form and should not be interpreted in limited sense. To understand the gist of the present invention, the appended claims should be considered.

The steps described in this Specification are not only executed in temporally sequential order but also may be executed in parallel or separately in accordance with the processing ability of an executing apparatus or as required. In this Specification, the "system" is a logical set of a plurality of apparatuses and the apparatuses are not always accommodated in a single housing.

What is claimed is:

1. A digital watermark embedding device, comprising:
    digital-watermark-pattern generating means for generating a digital watermark pattern based on embedding information;
    motion-detecting means for dividing a picture signal into a plurality of blocks, the picture signal to be digitally watermarked, detecting a plurality of motion vectors representing motion detected between a given two frames of the picture signal and being associated with the plurality of blocks such that a given one of the plurality of motion vectors is associated with a particular one of the plurality of blocks, for extracting, from the plurality of blocks, respective picture regions of blocks such that the motion vectors of the blocks of a given picture region are substantially identical, the picture regions defining a plurality of objects, at least one of the plurality of objects being defined by a different sized region than that defining at least another of the plurality of objects, for performing, for each one of the plurality of objects, a predetermined evaluation of the motion vectors of the blocks of that object to generate optimal motion information defining a single motion vector for that object, for performing a further predetermined evaluation of the defined motion vectors for each one of the plurality of objects to generate optimal motion information on the entirety of the picture signal representing motion within the picture signal that is most readily detectable by the human eye, the optimal motion information defining a single further motion vector, and outputting the motion information defining the single further motion vector;
    modulating means for modulating the digital watermark pattern in the picture signal using only the single further motion vector so that the digital watermark pattern is moved to follow the motion represented by the single further motion vector; and
    embedding means for embedding the modulated digital watermark pattern within the entire frame of the picture signal.

2. The digital watermark embedding device according to claim 1, wherein said motion-detecting means equally divides the picture signal to be digitally watermarked to obtain the plurality of blocks, and detects the plurality of motion vectors using the equally divided plurality of blocks.

3. A digital watermark embedding device according to claim 1, wherein at least one of the predetermined evaluation performed by said motion-detecting means or the further predetermined evaluation performed by said motion-detecting means includes selecting motion vectors having a majority of magnitudes and directions.

4. The digital watermark embedding device according to claim 1, wherein at least one of the predetermined evaluation performed by said motion-detecting means or the further predetermined evaluation performed by said motion-detecting means includes obtaining an average.

5. The digital watermark embedding device according to claim 1, wherein the further predetermined evaluation performed by said motion-detecting means includes more greatly weighting motion vectors near a center of a picture represented by the picture signal and less greatly weighting motion vectors near a periphery of the picture represented by the picture signal.

6. A digital watermark embedding method, comprising:
    generating a digital watermark pattern based on embedding information;
    dividing, into a plurality of blocks, a picture signal to be digitally watermarked;
    detecting a plurality of motion vectors representing motion detected between a given two frames of the picture signal, the plurality of motion vectors being associated with the plurality of blocks such that a given one of the plurality of motion vectors is associated with a particular one of the plurality of blocks;
    extracting, from the plurality of blocks, respective picture regions of picture blocks such that the motion vectors of the blocks of a given picture region are substantially identical, the picture regions defining a plurality of objects, at least one of the plurality of objects being defined by a different sized region than that defining at least another of the plurality of objects;
    performing, for each one of the plurality of objects, a predetermined evaluation of the motion vectors of the blocks of that object to generate optimal motion information defining a single motion vector for that object;
    performing a further predetermined evaluation of the defined motion vectors for each one of the plurality of objects to generate optimal motion information on the entirety of the picture signal representing motion within the picture signal that is most readily detectable by the human eye, the optimal motion information defining a single further motion vector;
    outputting the motion information defining the single further motion vector;
    modulating the digital watermark pattern in the picture signal using only the single further motion vector so that the digital watermark pattern is moved to follow the motion represented by the single further motion vector; and
    embedding the modulated digital watermark pattern within the picture signal.

7. The digital watermark embedding method according to claim 6, wherein said dividing step equally divides the picture signal to be digitally watermarked to obtain the plurality of blocks, and said detecting step detects the plurality of motion vectors using the equally divided plurality of blocks.

8. The digital watermark embedding method according to claim 6, wherein at least one of said step of performing the predetermined evaluation or said step of performing the further predetermined evaluation includes selecting motion vectors having a majority of magnitudes and directions.

9. The digital watermark embedding method according to claim 6, wherein at least one of said step of performing the predetermined evaluation or said step of performing the further predetermined evaluation includes obtaining an average of motion vectors.

10. The digital watermark embedding method according to claim 6, wherein said step of performing the further predetermined evaluation of the plurality of motion vectors includes more greatly weighting motion vectors near a center of a picture represented by the picture signal and less greatly weighting motion vectors near a periphery of the picture represented by the picture signal.

11. The digital watermark embedding device according to claim 1, wherein at least one of the predetermined evaluation performed by said motion-detecting means or the further predetermined evaluation performed by said motion-detecting means includes more greatly weighting motion vectors that represent greater magnitudes of motion and less greatly weighting motion vectors that represent lesser magnitudes of motion.

12. The digital watermark embedding method according to claim 6, wherein at least one of said step of performing the predetermined evaluation or said step of performing the further predetermined evaluation includes more greatly weighting motion vectors that represent greater magnitudes of motion and less greatly weighting motion vectors that represent lesser magnitudes of motion.

* * * * *